US012656259B2

(12) United States Patent
Creasey et al.

(10) Patent No.: US 12,656,259 B2
(45) Date of Patent: Jun. 16, 2026

(54) IDENTIFYING SUBSTANCES STORED IN CONTAINERS UTILIZING A PORTABLE RAMAN PROBE

(71) Applicant: Wasatch Photonics, Inc., Logan, UT (US)

(72) Inventors: David John Creasey, Dublin (IE); Elroy Louis Pearson, Clarkston, UT (US); Jonathan Mark Faircloth, Morrisville, NC (US); Dieter Bingemann, Wiesbaden (DE)

(73) Assignee: Wasatch Photonics, Inc., Logan, UT (US)

( * ) Notice: Subject to any disclaimer, the term of this patent is extended or adjusted under 35 U.S.C. 154(b) by 32 days.

(21) Appl. No.: 18/634,646

(22) Filed: Apr. 12, 2024

(65) Prior Publication Data

US 2024/0353334 A1      Oct. 24, 2024

Related U.S. Application Data

(60) Provisional application No. 63/496,907, filed on Apr. 18, 2023.

(51) Int. Cl.
*G01N 21/65*          (2006.01)
*G01N 21/64*          (2006.01)
(Continued)

(52) U.S. Cl.
CPC .......... *G01N 21/65* (2013.01); *G01N 21/6458* (2013.01); *G06N 3/045* (2023.01);
(Continued)

(58) Field of Classification Search
CPC .............. G01N 21/65; G01N 21/6458; G01N 2021/6463; G01N 2021/656;
(Continued)

(56) References Cited

U.S. PATENT DOCUMENTS

| | | | |
|---|---|---|---|
| 5,963,359 | A | 10/1999 | Shinozaki et al. |
| 8,248,600 | B2 | 8/2012 | Matousek et al. |

(Continued)

FOREIGN PATENT DOCUMENTS

| | | | | |
|---|---|---|---|---|
| CA | 2776233 | A1 * | 8/2011 | ........... A61B 5/0066 |
| CN | 202102170 | U | 1/2012 | |

(Continued)

OTHER PUBLICATIONS

Fleming, Holly, et al. "Through-bottle whisky sensing and classification using Raman spectroscopy in an axicon-based backscattering configuration." Analytical Methods 12.37 (2020): 4572-4578. (Year: 2020).*

(Continued)

*Primary Examiner* — Dominic J Bologna
(74) *Attorney, Agent, or Firm* — Ray Quinney & Nebeker P.C.; James S. Bullough

(57) ABSTRACT

The present disclosure relates to a portable Raman probe that uses axicon lenses ("axicons"), grating axicons ("graxicons"), and other optical elements to collect spectra from substances behind non-opaque barriers using off-axis techniques. The portable Raman probe can also include a Raman spectrometer to analyze the collected spectra, and a spectra refinement machine-learning model to generate refined spectra from raw or noisy collected samples.

20 Claims, 24 Drawing Sheets

(51) Int. Cl.

| | |
|---|---|
| *G06N 3/045* | (2023.01) |
| *G06N 3/08* | (2023.01) |
| *G06N 3/084* | (2023.01) |

(52) U.S. Cl.
CPC .............. *G06N 3/08* (2013.01); *G06N 3/084* (2013.01); *G01N 2021/6463* (2013.01); *G01N 2021/656* (2013.01); *G01N 2201/0221* (2013.01); *G01N 2201/0635* (2013.01); *G01N 2201/0636* (2013.01)

(58) Field of Classification Search
CPC ... G01N 2201/0221; G01N 2201/0635; G01N 2201/0636; G06N 3/045; G06N 3/08; G06N 3/084
See application file for complete search history.

(56) References Cited

U.S. PATENT DOCUMENTS

| | | | |
|---|---|---|---|
| 9,983,127 B2 | 5/2018 | Liu et al. | |
| 2004/0073120 A1* | 4/2004 | Motz ........................ | A61B 1/07 |
| | | | 600/478 |
| 2010/0053606 A1* | 3/2010 | Matousek ................. | G01J 3/44 |
| | | | 356/301 |
| 2012/0218558 A1 | 8/2012 | Cenko et al. | |
| 2013/0172862 A1 | 7/2013 | Suckewer | |
| 2015/0062573 A1* | 3/2015 | Liu ........................ | A61B 5/444 |
| | | | 356/300 |
| 2015/0216417 A1* | 8/2015 | Huang ................. | A61B 5/7221 |
| | | | 600/476 |
| 2018/0073355 A1 | 3/2018 | Bhongale et al. | |
| 2022/0003680 A1* | 1/2022 | Chadri ................. | G01J 3/0218 |
| 2022/0266387 A1 | 8/2022 | Flamm | |
| 2022/0327691 A1 | 10/2022 | Pelissier et al. | |
| 2024/0087084 A1 | 3/2024 | Shroff et al. | |
| 2024/0099687 A1 | 3/2024 | Roth et al. | |
| 2024/0280474 A1 | 8/2024 | Bell | |

FOREIGN PATENT DOCUMENTS

| | | | |
|---|---|---|---|
| JP | 2009178725 A | 8/2009 | |
| WO | 2022150353 A1 | 7/2022 | |

OTHER PUBLICATIONS

"International Search Report and Written Opinion Issued in PCT Application No. PCT/US24/25170", Mailed Date: Jun. 29, 2024, 20 Pages.

Dyson, "Circular and spiral diffraction gratings," Research Laboratory, Associated Electrical Industries Limited, Aldermaston, Berkshire, Mar. 12, 1958, 16 pages.

Fleming et al., "Through-bottle whisky sensing and classification using Raman spectroscopy in an axicon-based backscattering configuration," https://pubs.rsc.org/en/content/articlehtml/2020/ay/d0ay01101k, Aug. 2020, 7 pages.

Okayasu et al, "Feasibility study of a single-shot 3D electron bunch charge distribution monitor with a polarized probe laser at SPring-8 photoinjector," DIPAC2011, Hamburg, Germany, 2011, 1 page.

Bock et al. "Few-cycle high-contrast vortex pulses." Optics Letters, vol. 37, No. 18, 2012, pp. 3804-3806.

Brunne et al., "Fast and robust piezoelectric axicon mirror." Optics Letters, vol. 39, No. 15, 2014, pp. 4631-4634.

Redding et al., "Optical trap for both transparent and absorbing particles in air using a single shaped laser beam." 3 Optics Letters, vol. 40, No. 12, 2015, pp. 2798-2801.

Dickey, Fred M. et al., "Annular ring zoom system using two positive axicons," Proceedings of SPIE, vol. 8130, 81300B, 2011, 7 pages.

Edmonds, W.R., "The Reflaxicon, a New Reflective Optical Element, and Some Applications," Applied Optics, vol. 12, No. 8, Aug. 1973, 6 pages.

Holo / Or, "Diffractive Axicon Application Notes," [retrieved on Jan. 28, 2026]. Retrieved from the internet: www.holoor.co.il/application/diffractive-axicon-application-notes/, 16 pages.

Lei, Ming et al., "Long-Distance Axial Trapping with Focused Annular Laser Beams," PLOS One, Mar. 7, 2013, retrieved from https://journals.plos.org/plosone/article?id=10.1371/journal.pone.0057984, 7 pages.

Niggle, L. et al., "Properties of Bessel beams generated by periodic gratings of circular symmetry," Journal of the Optical Society of America, vol. 14, No. 1, Jan. 1997, 7 pages.

* cited by examiner

Portable Raman Probe with Spectrometer 100a

Light Scattered Off Substance 114

Container 104

Non-Opaque Barrier 106

Scan: Ethanol

Substance 108

Emitted Light 110

Light Scattered Off Barrier 112

Portable Raman Probe 400b

Spectrometer 350

Optical Elements 320

Axicon Periscope 422

Light Source 120

Pass-Through Mirror 124

Grating Axicon Lens 326

Collection Lens 128

Axicon Periscope 522a
Cut-Out View

Axicon Periscope 522b
Cut-Out View

Axicon Periscope 522c
Side View

Larger Light Ring 506a A

Smaller Light Ring 506b B

Exterior Axicon Lens 502

Interior Axicon Lens 504

Axicon Periscope 522d
Cut-Out View

Exterior Axicon Lens 502

Interior Axicon Lens 504

Light Source 120

220

506

Adjustable Axicon Periscope 602
Cut-Out View

Adjustable Exterior
Element 608

Light Ring
620

Light Source 120

Adjustable
Interior
Element 610

Light 220

Exterior Flexible Axicon Membrane 604

Interior Flexible Axicon
Membrane 606

Adjustable Axicon Periscope 602
Side View

620

Interior
Flexible
Axicon
Membrane
606

Exterior Flexible
Axicon
Membrane 604

Adjustable Axicon Periscope 602a
Cut-Out View

Adjustable Axicon Periscope 602b
Side View

Diffractive Focusing Element 700a

Reflective Focusing Element 700b

Refractive Focusing Element 700c

Grating Axicon Lens 802
Side View

Grating +
Axicon 806

Interior Lens
Hole 804

Grating Axicon Lens 802
Perspective View 806                                                    804

Grating Axicon Lens 802a
Side View

First
Illumination
Pattern
806a

Second
Illumination
Pattern
806b

Illumination Pattern Profiles 820

Grating Axicon
Lens 802

Portable Raman
Probe 800

810a

810b 804    210

810c

810d

810e

Portable Raman Probe 900a

Generating Training Spectrum Pairs

Spectral Analysis Output 1100

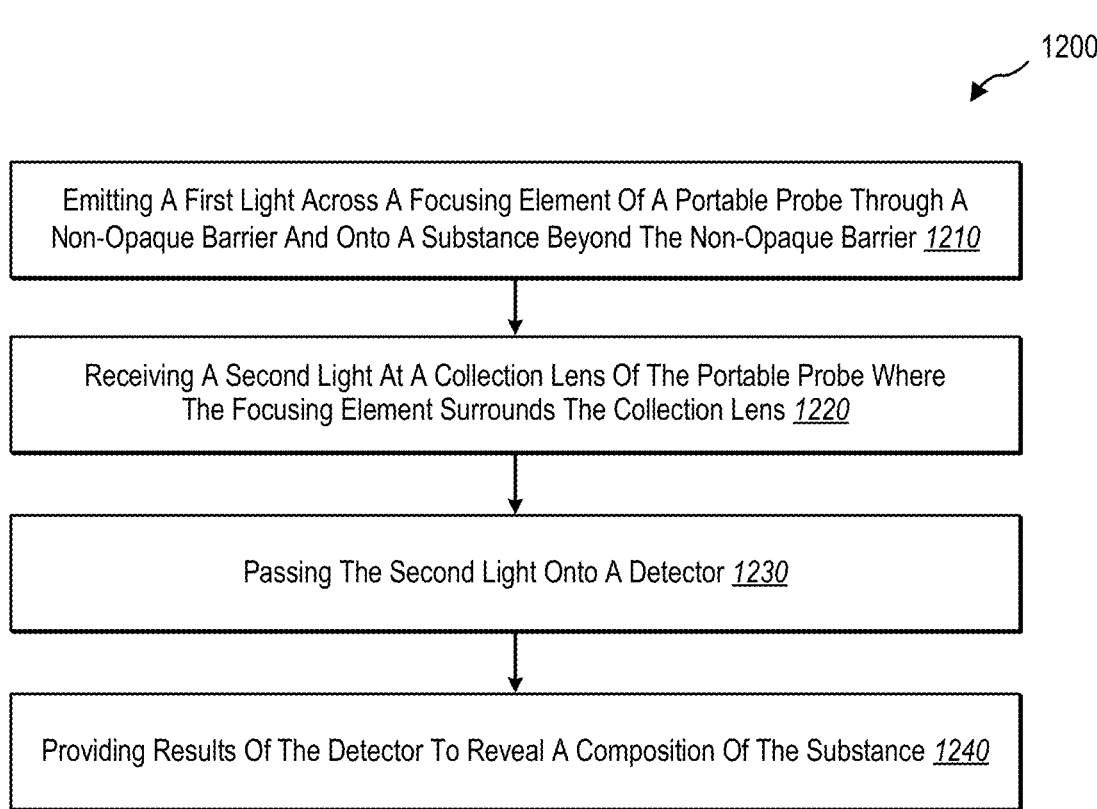

1200

Emitting A First Light Across A Focusing Element Of A Portable Probe Through A Non-Opaque Barrier And Onto A Substance Beyond The Non-Opaque Barrier *1210*

Receiving A Second Light At A Collection Lens Of The Portable Probe Where The Focusing Element Surrounds The Collection Lens *1220*

Passing The Second Light Onto A Detector *1230*

Providing Results Of The Detector To Reveal A Composition Of The Substance *1240*

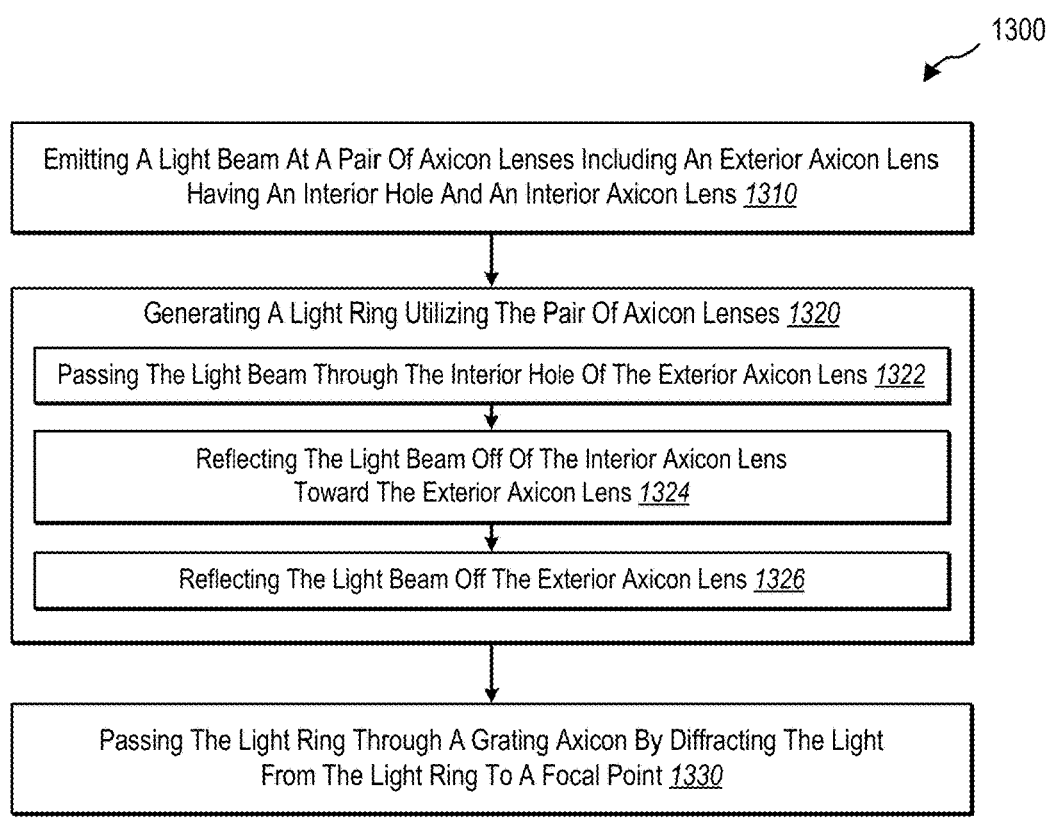

Emitting A Light Beam At A Pair Of Axicon Lenses Including An Exterior Axicon Lens Having An Interior Hole And An Interior Axicon Lens *1310*

Generating A Light Ring Utilizing The Pair Of Axicon Lenses *1320*

Passing The Light Beam Through The Interior Hole Of The Exterior Axicon Lens *1322*

Reflecting The Light Beam Off Of The Interior Axicon Lens Toward The Exterior Axicon Lens *1324*

Reflecting The Light Beam Off The Exterior Axicon Lens *1326*

Passing The Light Ring Through A Grating Axicon By Diffracting The Light From The Light Ring To A Focal Point *1330*

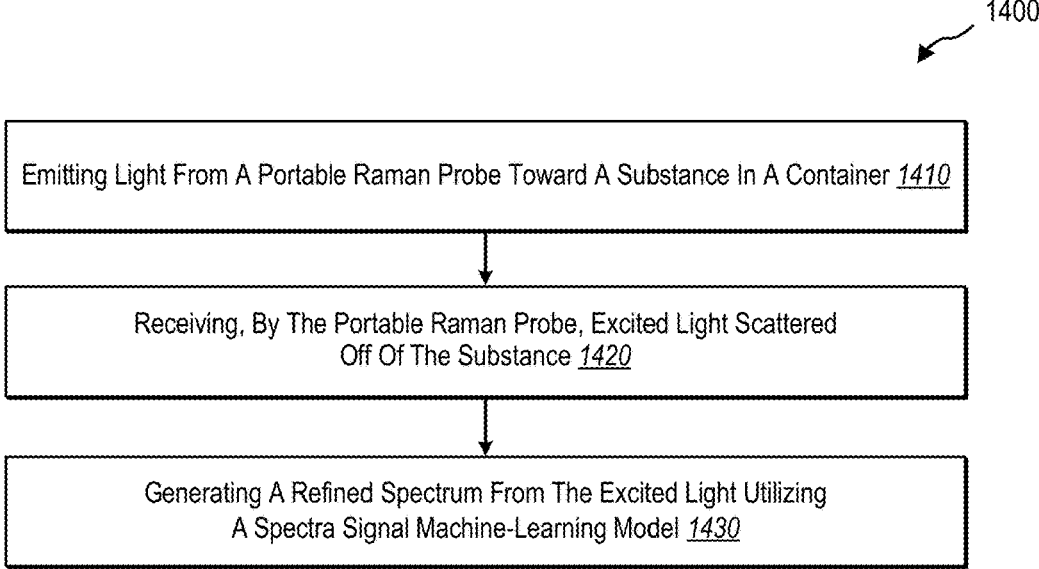

Emitting Light From A Portable Raman Probe Toward A Substance In A Container *1410*

Receiving, By The Portable Raman Probe, Excited Light Scattered Off Of The Substance *1420*

Generating A Refined Spectrum From The Excited Light Utilizing A Spectra Signal Machine-Learning Model *1430*

FIG. 14

IDENTIFYING SUBSTANCES STORED IN CONTAINERS UTILIZING A PORTABLE RAMAN PROBE

CROSS-REFERENCE TO RELATED APPLICATIONS

This application claims priority to U.S. Provisional Application No. 63/496,907, filed on Apr. 18, 2023, and entitled IDENTIFYING SUBSTANCES STORED IN CONTAINERS UTILIZING A PORTABLE RAMAN PROBE.

BACKGROUND

Raman spectroscopy is a technique used to determine the composition of samples, but existing systems have limitations. For context, Raman spectroscopy uses electromagnetic spectra to determine the composition of samples. A Raman spectrometer, for example, is an instrument that collects a spectrum from light scattered off sample substances, which serves as a fingerprint for characterizing samples. Raman spectroscopy is used for applications like quality control, authentication, and medical diagnostics.

Despite advancements in Raman spectroscopy, current systems still have limitations, particularly in identifying samples within containers. One common method for identifying samples in containers is through-barrier illumination, which involves shining light through a barrier, such as a container wall, to reach the sample inside. The light excites the sample and travels back through the barrier. However, through-barrier illumination introduces new problems for Raman spectroscopy.

To illustrate, through-barrier illumination performs poorly when a probe is directly facing a container because light fluoresces off the barrier and interferes with light excited off of the sample. Accordingly, some existing systems use off-axis illumination of the sample to try to minimize light fluorescing off the barrier. However, off-axis illumination probes are often large and unwieldy, with limited mobility and angle options for presenting light to the sample.

Additionally, many existing systems use probes that require large amounts of power (e.g., laser power) to acquire spectra suitable for a sample to be analyzed. Also, current systems often require prolonged acquisition times to obtain a usable spectrum, which can be further complicated if the probe is in motion during the scan. Further, while some existing systems have begun to use software to improve spectrum analysis, these systems continue to poorly generate usable sample spectra.

These and other problems in existing systems cause inefficiencies, inaccuracies, and inflexibilities with respect to using Raman spectroscopy to identify sample substances in containers.

BRIEF DESCRIPTION OF THE DRAWINGS

The detailed description provides one or more implementations with additional specificity and detail through the use of the accompanying drawings, as briefly described below.

FIG. 12 illustrates an example series of acts for utilizing a portable Raman probe to identify the composition of a substance within a container having a non-opaque barrier in accordance with one or more implementations.

FIG. 13 illustrates an example series of acts for utilizing a portable Raman probe to collect spectra for a substance within a container having a non-opaque barrier in accordance with one or more implementations.

FIG. 14 illustrates an example series of acts for utilizing a spectra refinement machine-learning model to generate a refined spectrum for a substance within a container having a non-opaque barrier in accordance with one or more implementations.

DETAILED DESCRIPTION

This document describes an improved portable Raman probe that solves problems of existing systems. For example, this document describes a portable Raman probe that utilizes axicon lens ("axicons"), grating axicons ("graxicons"), and other optical elements to collect spectra from substances behind non-opaque barriers utilizing off-axis techniques. Additionally, this document describes versions of a portable Raman probe that include a Raman spectrometer, such as a portable Raman spectrometer probe, to analyze the collected spectra. This document also describes versions of a spectra refinement machine-learning model that work with the portable Raman probe to create refined spectra from raw or noisy spectra.

Implementations of the portable Raman probe and related components in this document solve the previously mentioned problems and others in the field. Devices, systems, and methods utilize the portable Raman probe to quickly and accurately capture substance spectra utilizing the specialized axicons, graxicons, and/or machine-learning models described in this document. Examples of the portable Raman probe in this document are faster, more powerful, and more lightweight than current systems.

Consider the following scenario: A laboratory needs to safely dispose of multiple unlabeled chemical bottles with unknown contents. The unknown contents could be dangerous, making disposal costly and risky. An individual can use the portable Raman probe to quickly and accurately identify the contents of the unlabeled bottles. Once the contents are known, the laboratory can safely dispose of them. In another scenario, an individual can easily and quickly confirm the contents and quality of substances within containers without opening or moving them.

Figure 1A:
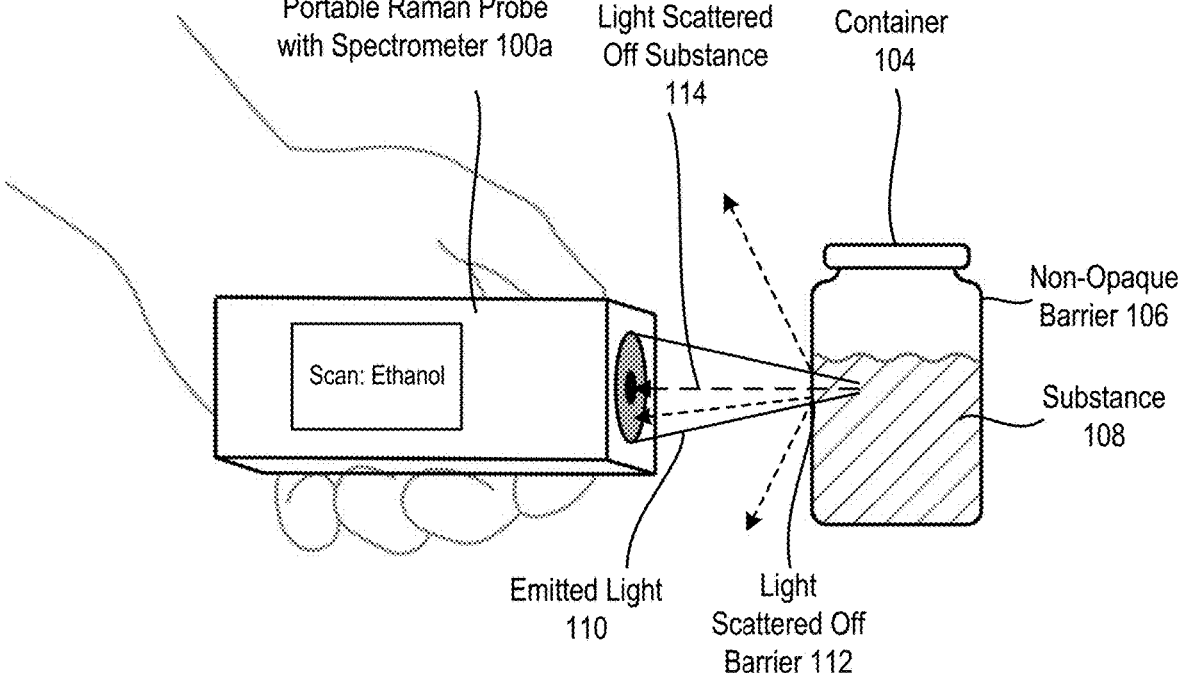
FIGS. 1A-1B illustrate example overviews for utilizing a portable Raman probe to detect a substance within a container in accordance with one or more implementations.
Figure 1B:
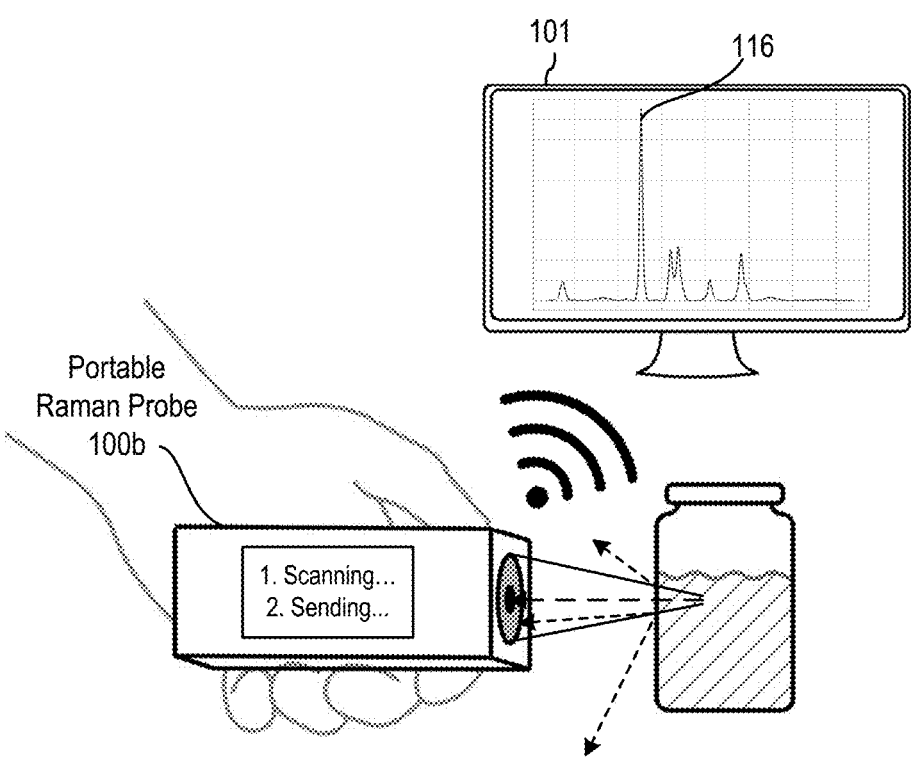

To help explain this document, details about the portable Raman probe will be given in relation to the accompanying figures. To illustrate, FIGS. 1A-1B illustrate example overviews for utilizing a portable Raman probe to detect a substance within a container in accordance with one or more implementations. As shown, FIG. 1A includes a portable Raman probe with spectrometer 100a as well as a container 104 that has a non-opaque barrier 106 and stores a substance 108. For example, a person is using the portable Raman probe with spectrometer 100a to determine the composition of the substance 108 inside the container 104 via Raman spectroscopy.

Raman spectroscopy is a powerful technique for determining the chemical composition of a wide range of sample substances, including solids and liquids. Typically, Raman spectroscopy requires direct and unobstructed illumination of the sample in order to be effective. However, direct access to a sample is not always possible, and many practical applications require using through-barrier illumination to initiate Raman excitation. This is particularly true for samples stored within containers, as through-barrier Raman spectroscopy is often safer and more cost-effective than directly handling the material.

In some cases, to achieve better results with through-barrier Raman spectroscopy, the probe provide off-axis illumination of the sample so that the emissions of the barrier (e.g., fluorescence, sharp Raman signals, or broadband Raman signals) scatter away from the probe's collection optics. Unfortunately, many existing probes that provide off-axis illumination in existing systems tend to be quite large, and as a result, are limited in the angles at which the illumination light can be presented to a sample.

As shown in FIG. 1A, the portable Raman probe with spectrometer 100a is a small, hand-held device that directs emitted light 110 towards container 104. Specifically, a surface of the portable Raman probe with spectrometer 100a (e.g., the bottom) faces a container 104 and shines emitted light 110 at an off-axis angle. In some instances, an off-axis light projection causes at least some of the emitted light 110 to scatter off the non-opaque barrier 106 (shown as light scattered off barrier 112) and away from the portable Raman probe with spectrometer 100a.

Additionally, some of the emitted light 110 that passes through the non-opaque barrier 106 reacts with substance 108 (shown as light scattered off substance 114) and returns to the portable Raman probe with spectrometer 100a. The portable Raman probe with spectrometer 100a collects the light scattered off substance 114 (e.g., substance backscatter emissions) while avoiding some, most, or all of the container backscatter (e.g., the light scattered off barrier 112). As described further below, in some cases, some of the light scattered of barrier 112 (e.g., barrier backscatter emissions)

will enter into the Raman probe with spectrometer 100a. In these instances, the barrier backscatter emissions are filtered out before reaching the spectrometer portion of the probe. This way, the Raman probe with spectrometer 100a focuses on analyzing the substance backscatter emissions of the substance 108.

In various implementations, the portable Raman probe with spectrometer 100a includes various optical elements to provide the emitted light 110, which are further described in connection with FIG. 1C. For example, the portable Raman probe with spectrometer 100a generates a light that is directed out of the probe by a focusing element to a focal point, aimed at substance 108. In various implementations, the ring light and/or focusing element utilize axicons (i.e., axicon lens) and/or graxicons to provide light from the portable Raman probe with spectrometer 100a at an off-axis angle to a container that includes a sample substance. The emitted light excites the sample and some of that excited light travels back toward the probe. The probe then uses a collection lens surrounded by the focusing element to collect a spectrum of the light scattered off substance 114 (e.g., the excited light) and processes the spectrum to analyze, identify, and verify the sample substance. In many implementations, the portable Raman probe with spectrometer 100a includes a probe-based system that works in connection with a spectrometer system.

The portable Raman probes described in this document can include various optical elements, such as axicons, graxicons, light periscopes, mirrors, etc., that greatly reduce the size of the probe to fit in a handheld device. Additionally, the various optical elements allow the probe to illuminate a sample from a wide range of angles, even with the compact size of the probe. In various implementations, a Raman probe communicates with an incorporated spectrometer (e.g., a Raman spectrometer probe) while is other implementations, a Raman probe communicates with a separate, external spectrometer, as further described below. Furthermore, as this document explains, implementations of the probe can be dynamically configurable. Indeed, the portable Raman probe may be used with a range of internal or external spectrometers.

As used in this document, the terms "axicon" or "axicon lens" refer to a specialized type of lens that transforms a light beam into a ring of light. For example, axicons have a flat edge on one side and a conical surface on the opposite edge (or inverted conical surface in the case of a negative axicon). Axicons can be reflective or transmissive. Light that enters the flat edge and exits from the conical edge transforms from a Gaussian into a Bessel beam. In this way, an axicon creates a non-diffractive ring-shaped beam of light that increases in diameter with distance from the axicon, while the ring of light maintains a constant thickness. In various implementations, an axicon creates a focusing beam, an expanding beam, or a collimated beam in the shape of a ring. Additionally, axicons can be made from glass, metal, plastic, or other materials.

The terms "diffraction grating" or "grating" refer to an optical element or component that deflects light using diffraction. For example, a diffraction grating includes a set of parallel spaced grooves and/or a periodic structure that diffracts light into multiple beams traveling in different directions. Gratings can be reflective or transmissive. Commonly, gratings are used in spectrometers to disperse a light source into different wavelength components. A graxicon can be made to create an axicon ring of decreasing, increasing, or constant diameter.

Additionally, the terms "grating axicon" or "graxicon" refer to a diffractive structure that performs a function similar to an axicon. A grating axicon can create Bessel beams much like an axicon, but with a more compact form factor. Also, a graxicon can be made to perform additional optical functions that would be difficult, if not impossible, to achieve with a traditional axicon. By using graxicons, the portable Raman probe can replace one or more optical components, greatly reducing its size while achieving the same optical properties. As a note, a graxicon is a diffractive optic that can emulate many of the optic functions of an axicon, but an axicon is not part of a graxicon. Additionally, a "Bessel beam" refers to a non-diffracting beam that maintains an unchanged transversal distribution as it propagates.

Additionally, in various implementations, the portable Raman probe with spectrometer 100a processes a sample spectrum of the substance 108 based on the light scattered off substance 114. If the portable Raman probe with spectrometer 100a includes a spectrometer, the portable Raman probe with spectrometer 100a (e.g., a portable Raman spectrometer probe) analyzes the substance spectrum to determine the chemical composition of the substance 108. For example, the portable Raman probe with spectrometer 100a in FIG. 1A shows a reading of Ethanol for the substance 108. In some implementations, the portable Raman probe with spectrometer 100a displays a wavelength readout of the identified composition of the substance 108 within the container 104.

To illustrate, in one or more implementations, the portable Raman probe is used to detect substances stored in non-opaque containers. For example, a portable Raman spectrometer probe emits a first wavelength range of light across a grating axicon (or other focusing element) of the portable spectrometer probe through a non-opaque barrier and onto a substance beyond the non-opaque barrier. Upon interacting with the substance, the emitted light becomes excited light (e.g., some of the laser light is scattered as Raman light) and changes to a second wavelength. In some instances, the second wavelength is 1 million times weaker than the strength of the first wavelength.

As used in this document, the term "non-opaque barrier" is a material that holds a substance within a container and allows a threshold amount of light to pass through it. For example, a non-opaque barrier includes any barrier that, based on its composition and thickness, allows some emitted light (e.g., at least a small fraction of emitted laser light) to pass through the barrier and light excited from a substance (e.g., fluorescence light or non-elastically scattered light) beyond the barrier to pass back through the barrier, such that a portable Raman probe generates a spectrum from the collected excited light. The term "substance" refers to matter that includes a chemical composition that emits excited light when excited by incident light radiation.

The portable Raman spectrometer probe then receives a second wavelength range of light at a collection lens (e.g., collection optics) of the portable spectrometer probe, where the collection lens is encircled by the grating axicon. Additionally, the portable Raman spectrometer probe passes the second wavelength range of light through a diffraction grating within the portable Raman spectrometer probe that diffracts the second wavelength range onto a light detector and provides processing results of the light detector to reveal the chemical composition of the substance beyond the non-opaque barrier.

The portable Raman probe is able to detect various types of substances stored in various types of containers. In various examples, the portable Raman probe detects various liquids and solids, such as active pharmaceutical ingredients (APIs), salts, ethanol variants, sugars, and other emitters. Additionally, the portable Raman probe works with various container types, such as plastic products (e.g., high-density polyethylene (HDPE)), glass (e.g., clear and colored), paper products, and other products that have non-opaque barriers.

As mentioned above, a portable Raman probe (e.g., a graxicon probe) allows off-axis laser excitation and on-axis emission collection. In this manner, the portable Raman probe becomes an important tool for the excitation of emission spectra (e.g., Raman spectra), especially through a barrier of a container as the probe is designed to avoid most of the unwanted emission from the barrier material while also mainly collecting emission from the sample substance behind the barrier.

Additionally, in one or more implementations, a portable Raman probe is coupled to a spectrometer to record emissions. For example, the portable Raman probe is directly attached to a spectrometer as a single unit or connected in a modular fashion with the probe and spectrometer (e.g., using optical fibers). The spectrometer often uses grating and imaging optics to disperse the emission into a spectrum, which is measured on a multi-pixel detector, such as a CCD detector or a CMOS detector, with the detector pixels arranged either as a linear array or as a two-dimensional array. In some implementations, the spectrometer transforms the emission from a sample substance into digital output in the form of a spectrum consisting of intensities as measured at multiple wavelengths simultaneously using the multi-pixel detector.

In various implementations, the portable Raman probe does not include a spectrometer and instead provides collected excited light to a spectrometer located on a different device. In various instances, the spectrometer splits the light into a spectrum and detects the relative intensities of the various wavelengths using a spectrum analysis processor. In some instances, the spectrometer can use library algorithms and/or tools to determine what substance is being examined. In various implementations, a spectrometer varies in types (e.g., grating, prims, or grating prism ("grism")).

To illustrate, FIG. 1B shows a portable Raman probe 100b providing data to a computing device 101, which analyzes and/or displays a wavelength readout 116 of the identified composition of the substance 108. For example, the portable Raman probe 100b in FIG. 1B can be the same or different from the probe described in FIG. 1A. Also, while FIG. 1B shows a wireless transmission of data from the portable Raman probe 100b to the computing device 101, in some instances, the probe provides data through a wired connection.

To illustrate, in one or more implementations, the portable Raman probe emits a light beam using a pair of axicon lenses (e.g., an exterior axicon lens and an interior axicon lens). In some instances, the exterior axicon lens includes an interior hole. Additionally, the portable Raman probe generates a light ring using the pair of axicon lenses by passing the light beam through the interior hole of the exterior axicon lens, reflecting the light beam off of the interior axicon lens toward the exterior axicon lens to generate a reflected light beam, and further reflecting the reflected light beam off the exterior axicon. Further, in these instances, the portable Raman probe passes the light ring through a grating axicon (e.g., an axicon with the light effect of a grating), where the grating axicon accepts the light ring and diffracts light from the light ring to a focal point beyond the remote processing resource (e.g., an optical diffraction device).

Additionally, in some implementations, the portable Raman probe uses a machine-learning model for spectrum refinement to further improve the substance spectrum. For example, a model integrated within the portable Raman probe or located on an external computing device (e.g., the computing device 101) removes noise and broadband background to enhance the quality of the spectrum (e.g., a table of numbers of pixel/wavelength/wavenumbers in a first column and intensities in a second column), which improves subsequent analysis. To illustrate, in one or more implementations, the portable Raman probe generates a refined spectrum from a noisy spectrum associated with the excited light by using a machine-learning model that is trained to reduce noise and fluorescence from noisy spectra.

As described in this document, the portable Raman probe provides several technical benefits with respect to collecting and processing substance spectra. Indeed, the portable Raman probe provides several practical applications by delivering benefits and solving problems through improved efficiency, accuracy, and flexibility over existing systems. Examples of various technical benefits and practical applications are discussed next as well as throughout this document.

As one example, the portable Raman probe provides a small and portable device that quickly captures Raman emissions of sample substances stored within non-opaque containers. Unlike existing systems, the portable Raman probe utilizes specialized components (e.g., axicons, graxicons, grating prisms, pass-through mirrors, and/or light ring emitters) and configurations (e.g., axicon periscope) that enable the probe to be greatly reduced in size. Among many implementations, the portable Raman probe is a hand-held device that operates on batteries. This allows the portable Raman probe to be moved to and around containers, rather than having to bring containers to a fixed Raman detector device.

As another benefit, by using focusing elements, such as a graxicon, the portable Raman probe enables illumination of the sample from a wide range of angles. The portable Raman probe allows an individual to point or face the probe at a container and direct off-axis emitted light toward the container. This greatly reduces unwanted fluorescence signals and backscatter from the container itself while still capturing ample amounts of Raman emissions from the sample substances in the containers.

Additionally, in many implementations, the portable Raman probe does not include moving optical and/or mechanical parts, which allows for compactness and improves durability and reliability of the probe. In a few implementations, the portable Raman probe includes a limited number of moving parts, which allow a user to configure the focal point and/or pattern of light being emitted by the probe to better capture Raman emissions of sample substances in the containers.

Further, when using the spectra refinement machine-learning model, the portable Raman probe can collect Raman emissions from sample substances in containers more quickly and with less precision, as the spectra refinement machine-learning model converts noisy and messy spectra of substances into refined spectra. In this manner, the spectra refinement machine-learning model allows the portable Raman probe to spend less acquisition time gathering Raman emissions, reduce power levels of a laser or other source light, mitigate shaky handling of the probe during capture, and increase the gain sensitivity during capture. Indeed, by reducing noise, broad-spectrum background, native fluorescents in the barrier or in the sample, and/or dynamically trimming an input spectrum, the spectra refinement machine-learning model allows the portable Raman probe to more efficiently, flexibly, and accurately capture Raman emissions from sample substances in containers.

Figure 1C:
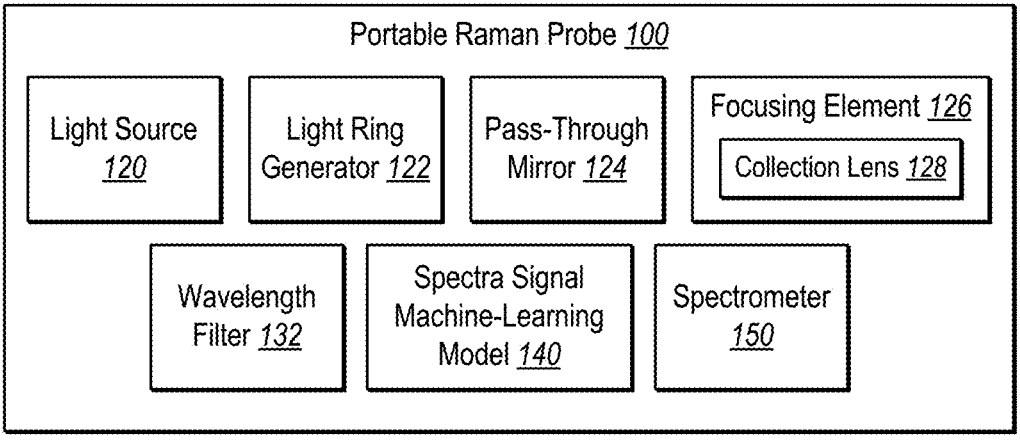
FIG. 1C illustrates example components of a portable Raman probe in accordance with one or more implementations.

Turning to FIG. 1C, additional details are provided regarding example components of a portable Raman probe in accordance with one or more implementations. As shown, FIG. 1C includes a representation of a portable Raman probe 100 having various components. These components can represent hardware and/or software components of the portable Raman probe 100. For example, the portable Raman probe 100 includes a light source 120, which may be a single hardware component or a set of hardware components with or without a software component.

As shown, the portable Raman probe 100 also includes a light ring generator 122, a pass-through mirror 124, a focusing element 126, a collection lens 128, a wavelength filter 132, a spectra refinement machine-learning model 140, and a spectrometer 150. Depending on the implementation, some components may be omitted. Indeed, different implementations of a portable Raman probe can include different and/or additional components than those shown in FIG. 1C.

As mentioned, the portable Raman probe 100 includes the light source 120. In various implementations, the light source 120 is a collimated light source of one or more laser diodes ("lasers") that emit a light path or a light beam (e.g., ~3 mm wide). In some implementations, the light source 120 is configured to emit light in a different pattern, such as a ring of light. For example, the light source 120 is a vertical-cavity surface-emitting laser (VCSEL) formed in a ring at a single wavelength.

The portable Raman probe 100 in FIG. 1C also includes a light ring generator 122. In various implementations, the light ring generator 122 transforms the light source 120 into a ring of light (if needed) or into another desired pattern (e.g., a "C" or "U" shape). As described below, depending on the components included, the light ring generator 122 generates an expanding or a non-expanding light ring. For example, the light ring generator 122 utilizes a pair of axicons to transform the light source 120 into a non-expanding light ring, as described below in connection with FIGS. 5A-5D.

Figure 9:
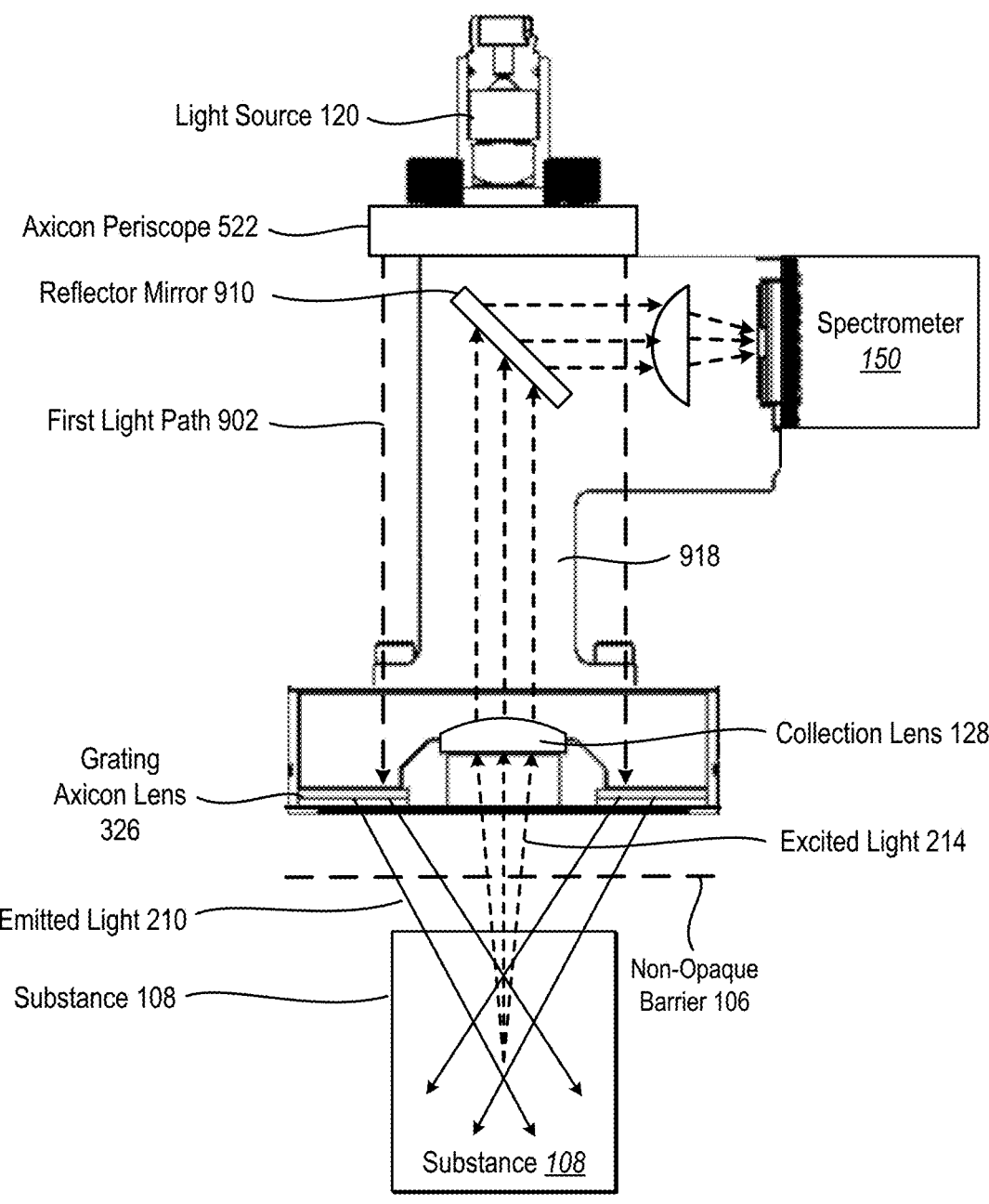
FIG. 9 illustrates example diagrams of portable Raman spectrometer probes in accordance with one or more implementations.

As shown, the portable Raman probe 100 includes the pass-through mirror 124. In one or more implementations, the pass-through mirror 124 reflects the ring of light traveling along a first light path while allowing a second light path to pass through the mirror. In various implementations, the pass-through mirror 124 includes a hole or a dichroic filter, as further described below in connection with FIG. 2. In some instances, the portable Raman probe 100 does not include a pass-through mirror 124, such as shown in FIG. 9.

The portable Raman probe 100 shown includes the focusing element 126. In general, the focusing element 126 directs light from the light source 120 from inside the probe toward a sample substance stored within a non-opaque container. In particular, the focusing element 126 directs light from the probe (e.g., excitation light) at an off-axis angle. In various implementations, the focusing element 126 includes a graxicon. Additional details regarding graxicons and other examples of the focusing element 126 are provided below with respect to FIGS. 7A-7C and 8A-8D.

Additionally, as shown, the focusing element 126 includes the collection lens 128. In many implementations, the focusing element 126 surrounds, encompasses, supports, and/or otherwise connects to the collection lens 128. In this manner, excitation light provided by focusing element 126 of the probe triggers excited Raman emissions off of the substance, which is collected by the collection lens 128 at the emission wavelength and where the collection lens 128 is adjacent to and/or surrounded by the focusing element 126. Examples of the collection lens 128 collecting light excited and/or fluorescing off a substance within a non-opaque container are provided in many of the following figures.

In various implementations, the collection lens 128 is offset from the bottom plane of the portable Raman probe 100. For example, the collection lens 128 is recessed into the probe. Accordingly, while the collection lens 128 is shown on the surface of the probe, in various implementations, the collection lens 128 is located away from the bottom surface that has the focusing element 126.

As shown, the portable Raman probe 100 includes the wavelength filter 132. In various implementations, the wavelength filter 132 is a rejection filter that filters out light having the same wavelength as light generated by the light source 120. In particular, the light source 120 generates light at a first wavelength that is emitted from the probe. When the emitted light interacts with the substance, excited light is generated having a second wavelength that has a different frequency from the first wavelength. Accordingly, the wavelength filter 132 cancels out or reduces any light at the first wavelength that may leak internally in the probe or backscatter into the collection lens 128. As described in later figures, the portable Raman probe 100 may include other optical components that work in connection with the wavelength filter 132 to filter and preprocess a raw spectrum created from the Raman emissions of the substance.

The portable Raman probe 100 in FIG. 1C also includes the spectra refinement machine-learning model 140. In general, the spectra refinement machine-learning model 140 is trained to remove and/or minimize unwanted noise and background fluorescence and/or signal from a raw and noisy input spectrum and generate a clean spectrum that includes clear, distinct peaks that emphasize key Raman features. In this manner, the spectra refinement machine-learning model 140 is given a noisy spectrum and generates a clean, clear, and usable Raman spectrum, which can be used for substance identification. Additional details regarding spectra refinement machine-learning models are provided below in connection with FIGS. 10A-10D.

In this document, the term "machine-learning model" refers to a computer representation that can be trained based on inputs to approximate unknown functions. For instance, a machine-learning model can include, but is not limited to, a transformer model, a sequence-to-sequence model, a neural network (e.g., a convolutional neural network or deep learning model), a decision tree (e.g., a gradient-boosted decision tree), a quantile regression model, a linear regression model, a logistic regression model, a random forest model, a clustering model, support vector learning, Bayesian network, regression-based model, principal component analysis, or a combination of the above. These models can include both deep-learning and shallow-learning models.

As shown, the portable Raman probe 100 includes the spectrometer 150. In various implementations, the spectrometer 150 measures the spectral components of spectra associated with sample substances. For example, the spectrometer 150 is an optical emission spectrometer that shows light intensities as a function of wavelength and/or frequency. In some instances, a light detector (e.g., light-sensitive electronics that turn collected light into an electrical signal) is one component of a spectrometer. Additionally, some versions of a portable Raman probe include a spectrometer, while other versions provide a sample spectrum to a spectrometer located on an external computing device. Additional details regarding spectrometers are provided with respect to FIG. 11.

Figure 2:
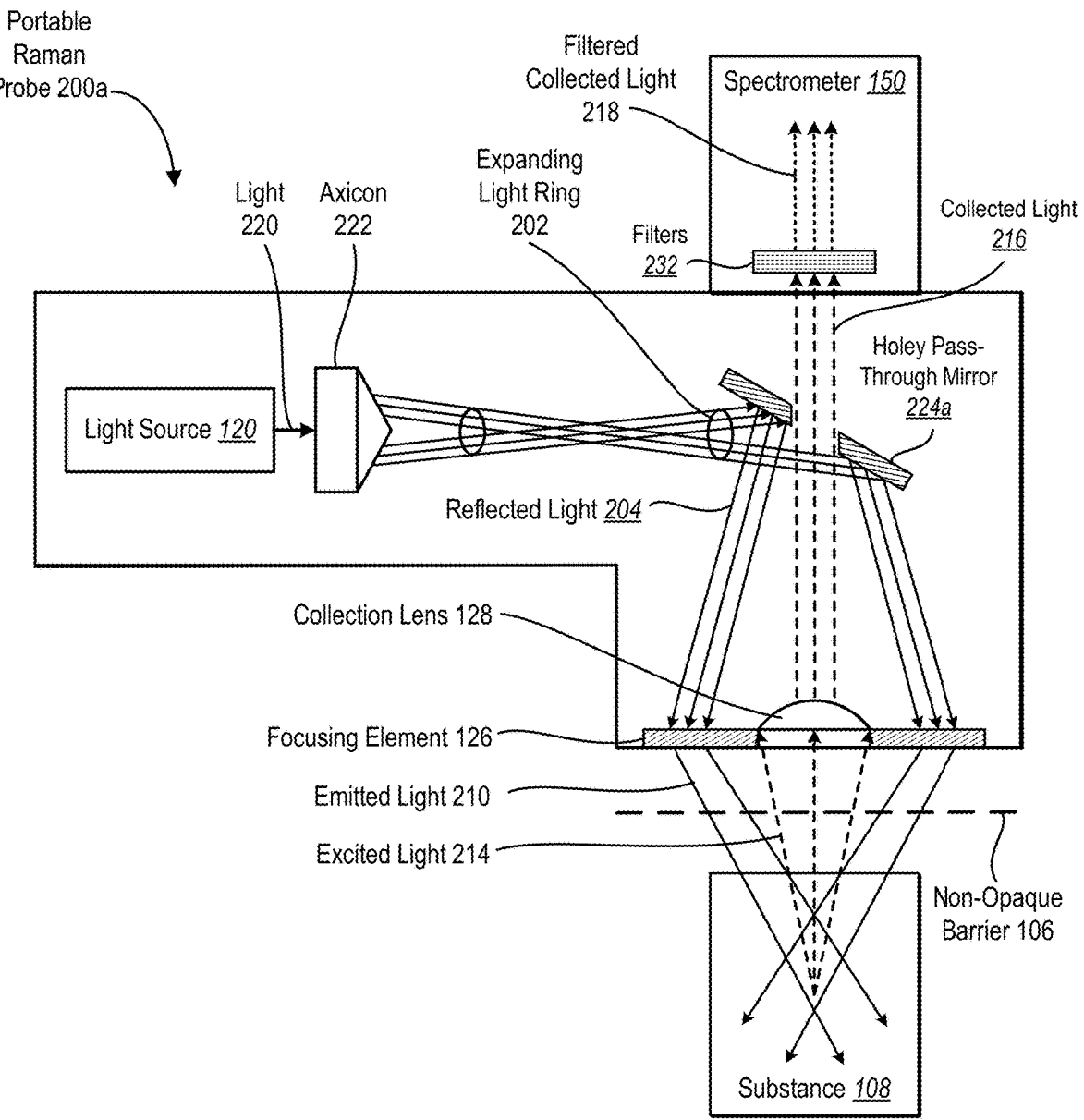
FIG. 2 illustrates example diagrams of a portable Raman probe in accordance with one or more implementations.

Additional details are now provided regarding implementations of the portable Raman probe. For example, as mentioned above, FIG. 2 provide examples of different versions of a portable Raman probe. In particular, FIG. 2 illustrate example diagrams of a portable Raman probe in accordance with one or more implementations. While these figures show a two-dimensional example, a three-dimensional version can be easily imagined from the drawings and accompanying description.

As shown, FIG. 2 includes a portable Raman probe 200a and the spectrometer 150 and a substance 108 that is located behind a non-opaque barrier 106 (e.g., a container barrier). In some implementations, the spectrometer 150 is part of the portable Raman probe, while in other implementations it is located on a different device. As shown, the portable Raman probe 200a includes various components, including some that were previously introduced, such as the light source 120, the focusing element 126, and the collection lens 128.

In addition, as shown, the portable Raman probe 200a includes an axicon 222, a holey pass-through mirror 224a, and filters 232. For example, the holey pass-through mirror 224a is a broadband reflector mirror that has a hole (or clear lens) in the middle to allow a narrower path, beam, or column of light to pass through the mirror while reflecting a wider beam or ring of light that is larger than the hole. Additionally, the filters 232 may be a wavelength filter and/or other types of filters. Additionally, the portable Raman probe 200a may include other components not illustrated.

Further, the portable Raman probe 200a includes an example light path guiding emitted light out of the probe and another example light path for collected excited Raman emissions from the substance 108. To illustrate, the portable Raman probe 200a includes a light 220 produced by the light source 120 (e.g., a collimated laser beam generated by a laser diode) that is provided to the axicon 222. In various implementations, the light source 120 generates light at a first wavelength or frequency.

Upon interacting with the axicon 222, the light 220 transforms into a focusing and then an expanding light ring 202, which reflects off of the holey pass-through mirror 224a. As shown, the expanding light ring 202 expands to a diameter that is larger than the diameter of the hole in the holey pass-through mirror 224a to reflect off the mirror surface toward the focusing element 126, which is shown as the reflected light ring 204.

The focusing element 126 directs the reflected light ring 204 out of the portable Raman probe 200a toward a focal point (e.g., a Bessel focal point) or range of focal points. For example, the focusing element 126 transforms the reflected light ring 204 from a ring of light to a spot or another pattern. To illustrate, in FIG. 2, emitted light 210 is directed out of the portable Raman probe 200a by the focusing element 126, such as a graxicon, toward a focal point at a first wavelength or frequency. In various implementations, the focusing element 126 is a diffractive focusing element, a reflective focusing element, or a refractive focusing element, which are described in more detail below with respect to FIGS. 7A-7C and 8A-8D.

In FIG. 2, while the focal point of the emitted light 210 is not shown, the direction of the emitted light 210 focuses on the substance 108 behind the non-opaque barrier 106. In this way, the concentration of emitted light 210 targets the substance 108 to cause Raman emissions to be created and scattered (e.g., non-elastically scattered and not fluoresced) back toward the collection lens 128 of the portable Raman probe 200a as excited light 214. In particular, the excited light 214 is scattered off of the substance 108 as a second wavelength that is different than the first wavelength (e.g., six orders of magnitude weaker). Additionally, in some instances, because the emitted light 210 exits the probe at an off-axis angle (e.g., greater than 45 degrees), some or most of the barrier backscatter emissions (having the first wavelength) may be directed away from the collection lens 128 of the probe. However, barrier backscatter emissions that enter the probe are filtered out and/or directed away from the spectrometer and kept separate from the substance backscatter emissions.

As shown, the collection lens 128 collects the excited light 214 that is excited by the substance 108 back into the portable Raman probe 200a. The collected light 216 passes through the holey pass-through mirror 224a to the filters 232. In various implementations, the collection lens 128 and/or a corresponding component collimate the excited light 214 into a light beam, as shown as the collected light 216. For example, the excited light 214 is collimated to a diameter that is smaller than the diameter of the hole or lens in the holey pass-through mirror 224a to allow the light beam to pass through without being reflected and be received by the spectrometer 150 (e.g., enter into a slit that forms the entrance of the spectrometer 150).

In various implementations, filters 232 process the collected light 216 by applying one or more filters to produce the filtered collected light 218. For example, the filters 232 can perform wavelength filtering to remove any light at the wavelength of the light source 120. The portable Raman probe 200a may also include other filters to clean and/or trim certain parts of the raw spectrum of the substance 108.

To elaborate, in various instances, some of the barrier backscatter emissions and/or reflections from the light source 120 pass into the collection lens 128 and enter the portable Raman probe 200a. In these instances, the barrier backscatter emissions are imaged into a ring around the entrance slit of the spectrometer 150, which causes the barrier backscatter emissions to miss the entrance slit of the spectrometer 150. In this way, the portable Raman probe 200a prevents the barrier backscatter emissions from entering the spectrometer 150.

As shown, the portable Raman probe 200a provides the filtered collected light 218 to the spectrometer 150 for analysis and composition detection of the substance 108. In various implementations, the spectrometer 150 generates a graphical representation of the spectrum to reveal the composition of the substance 108. In various implementations, the spectrometer 150 outputs text or tables of results. In some instances, if the spectrometer 150 is tuned to a particular substance, it can provide a positive or negative indication of the substance (e.g., a green light if the substance is ethanol, otherwise a red light).

Figure 3A:
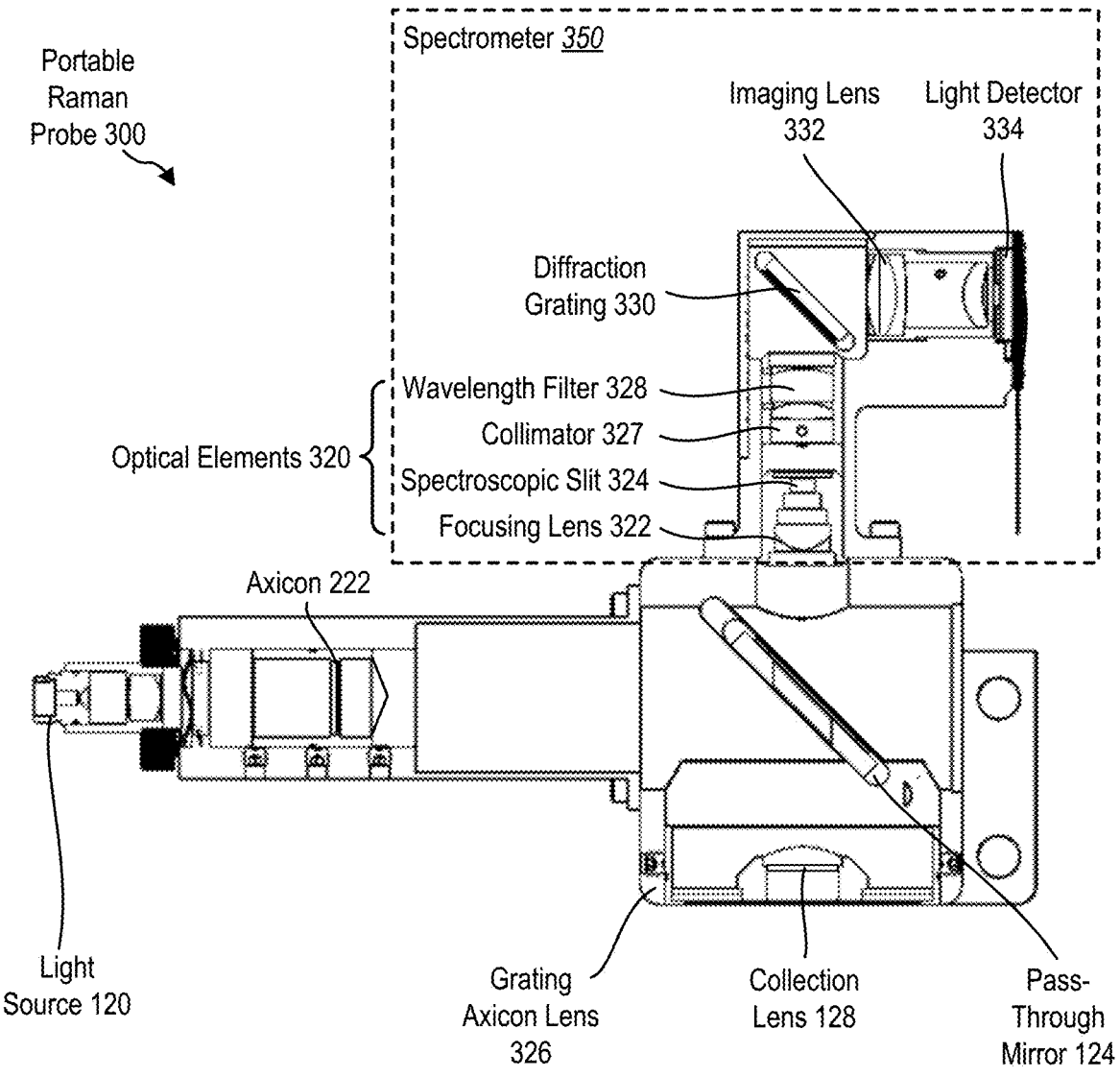
FIGS. 3A-3C illustrate additional example diagrams of a portable Raman probe in accordance with one or more implementations.
Figure 3B:
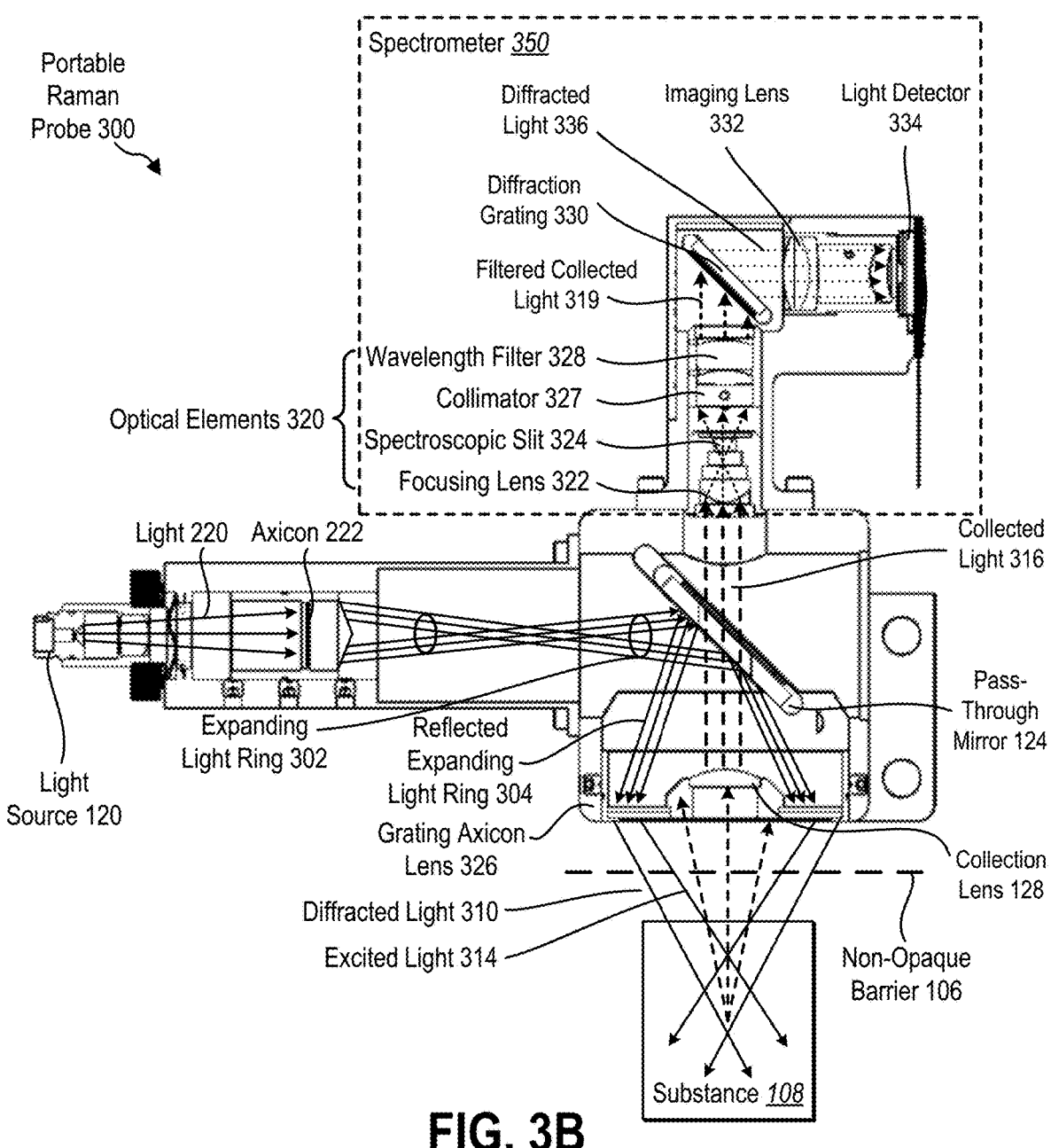
Figure 3C:
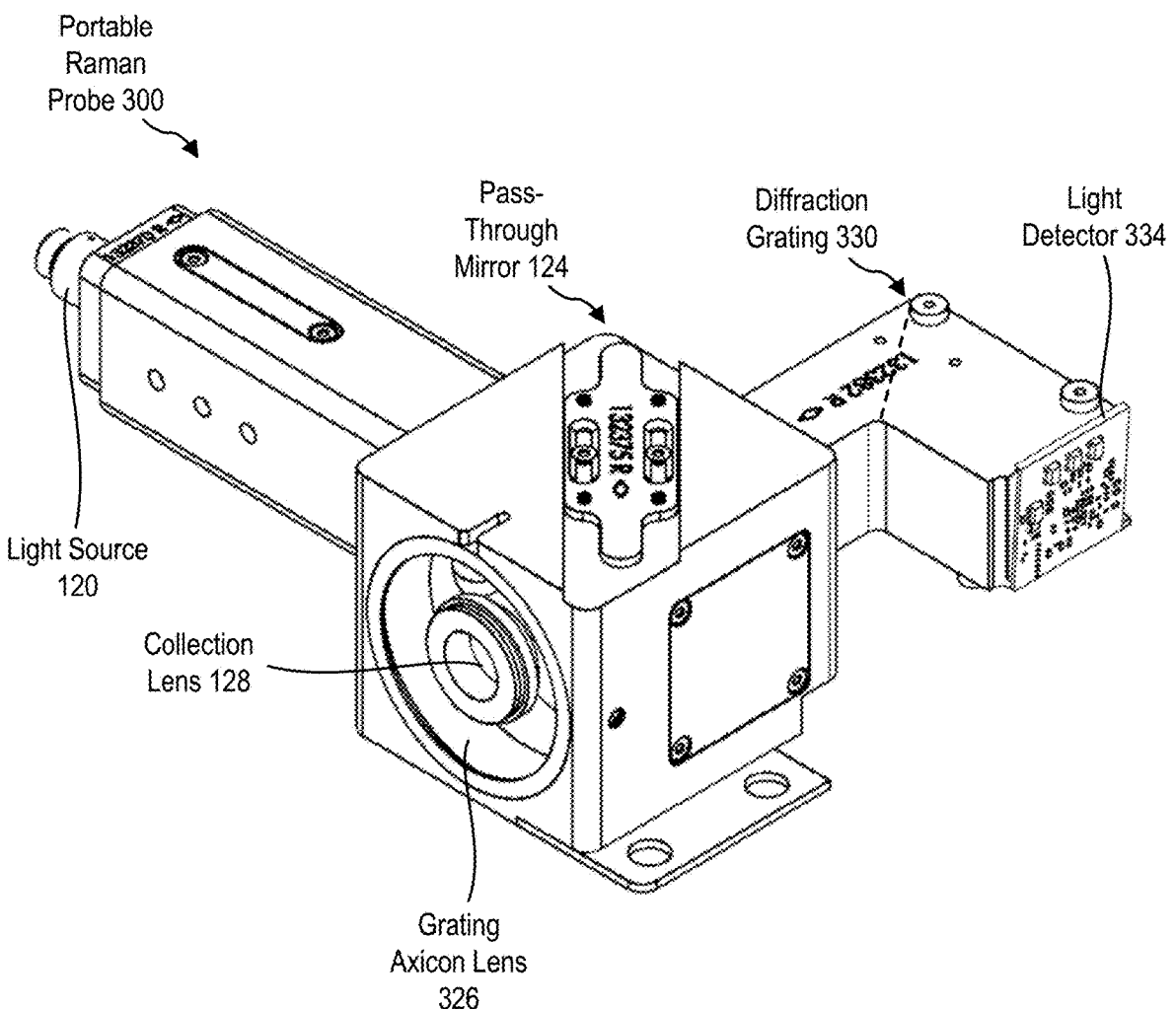

FIGS. 3A-3C illustrate additional example diagrams of a portable Raman probe 300 in accordance with one or more implementations. In particular, these figures provide more schematic-based examples of a version of a portable Raman probe. As shown, FIG. 3A includes components of a portable Raman probe 300 having a spectrometer (e.g., a portable Raman spectrometer probe). FIG. 3B adds light paths to FIG. 3A. FIG. 3C shows an outside view of FIG. 3A.

To illustrate, FIG. 3A includes the portable Raman probe 300, which includes a light source 120 (shown as a collimator that receives a light source, such as a coupled laser), an axicon 222, and a pass-through mirror 124 (such as a holey pass-through mirror 224a) as previously described. Additionally, the probe includes a grating axicon lens 326 (i.e., a graxicon) as the focusing element 126. A graxicon is a diffractive optic that can emulate many of the optical functions of an axicon. For example, a graxicon includes two glass elements with a diffraction grating sandwiched between them to form the grating axicon lens 326. Different types of grating cause incoming light to diffract out of the probe at varying angles (e.g., any angle between 20 degrees and 85 degrees).

As shown, the portable Raman probe 300 includes a collection lens 128 within the grating axicon lens 326. Additionally, the collection lens 128 focuses light into a collimated beam. The probe can also include additional elements for collecting, focusing, and directing excited light into the probe.

Additionally, the portable Raman probe 300 includes optical elements 320, such as a focusing lens 322, a spectroscopic slit 324, a collimator 327, and a wavelength filter 328. In various implementations, these elements filter, focus, and clean up the collected light 316 of a sample substance before it is passed to the light detector 334. Some implementations may also trim out a low-end and/or a high-end portion of the spectrum as part of the initial cleaning process.

The portable Raman probe 300, shown in FIG. 3A, is an example of a portable Raman spectrometer probe. It includes a spectrometer 350 that separates the collected light 316 into different wavelengths using a diffraction grating 330. The spectrometer also includes an imaging lens 332, which focuses the diffracted light onto a light detector 334. This allows a spectrum analysis processor to determine the wavelength of the spectrum of the sample substance that fell onto the light detector.

Additionally, the spectrometer 350 includes various circuitry components for processing the sample substance's spectrum. These components may include processors or integrated circuits (e.g., on a printed circuit board (PCB)) that analyze the spectrum data from the light captured at the light detector 334 and output a visualization or result.

FIG. 3B adds light paths to FIG. 3A. As shown, the light source 120 generates light 220 that travels to the axicon 222, which creates an expanding light ring 302. The diameter of the light ring increases as it travels away from the axicon 222 after it passes through a focus, while the width remains the same. The expanding light ring 302 reflects off the pass-through mirror 124 as reflected expanding light ring 304 and towards the focusing element, the grating axicon lens 326. While the axicon 222 is shown as a positive axicon, the portable Raman probe 300 may use a negative axicon to generate an expanding ring. In particular, a negative axicon includes a flat edge on one side and an inverted conical surface on the opposite edge that causes light passing through it to immediately expand into a ring.

The grating axicon lens 326 of the portable Raman probe 300 directs the light ring 304 out of the probe as diffracted light 310 (excitation light) towards the substance 108 located behind the non-opaque barrier 106 of a container. As mentioned earlier, some of the diffracted light 310 will scatter off the non-opaque barrier 106 (e.g., barrier backscatter emissions) and may be directed away from the collection lens 128. Other portions of the diffracted light 310 will penetrate through the non-opaque barrier 106, due to its off-axis angle at contact with the substance 108, where some of it will become excited light 314.

Some of the excited light 314 will scatter or fluoresce back towards the portable Raman probe 300 and be collected by the collection lens 128 (which may be sunk partially into the probe). As shown, the excited light 314 is collected and collimated into a light beam by the collection lens 128. In some implementations, it will then pass through the pass-through mirror 124 and into the optical elements 320. As mentioned earlier, the optical elements 320 will apply preliminary filtering, trimming, and processing to the spectrum, shown as the filtered collected light 319. As also mentioned, barrier backscatter emissions that enter into the portable Raman probe 300 will be imaged into a ring and miss the slit entrance of the spectrometer 350.

Further, as shown, the spectrometer 350 receives the collimated light from the collimator 327, diffracts it into diffracted light 336, and provides the diffracted light 336 to the light detector 334 via the imaging lens 332. In some instances, a spectrum analyzer processer analyzes the spectrum of the sample substance to determine its composition. In various implementations, the a computing device displays the resulting output on the portable Raman probe 300. In some implementations, the portable Raman probe 300 sends the results to a display on an external computing device.

In some implementations, the output confirms the presence or absence of a specific chemical compound. In one or more implementations, the portable Raman probe 300 displays a visual of wavelength measurements. In various implementations, the portable Raman probe 300 outputs text or tables of results.

In one or more implementations, the output to a list, collection, or library of known measurements are compared (e.g., by a computing device) to confirm the presence or absence of a specific chemical compound in the sample. For example, different wavelength measurements at different magnitudes are compared to a set of wavelength measurements of known samples to identify an unknown substance in a given sample.

FIG. 3C illustrates an example of the exterior of the portable Raman probe 300. This figure also helps to show the three-dimensional nature of the portable Raman probe 300 and how it corresponds to a circular light ring. As shown, the portable Raman probe 300 in FIG. 3C includes a few of the components discussed above, such as the light source 120, the pass-through mirror 124 (e.g., its location and orientation), the grating axicon lens 326 (e.g., a focusing element), the collection lens 128, the grating 330, and the light detector 334, among other components.

In certain implementations, the light source 120 needs to be located far enough away from the pass-through mirror 124 (and a focusing element) to create a sufficiently long light path that allows the size of the light ring to expand and properly contact the grating axicon lens 326. However, as shown in the next set of figures, portable Raman probes can be modified to reduce the length of this light path and the overall size of the probe.

Figure 4A:
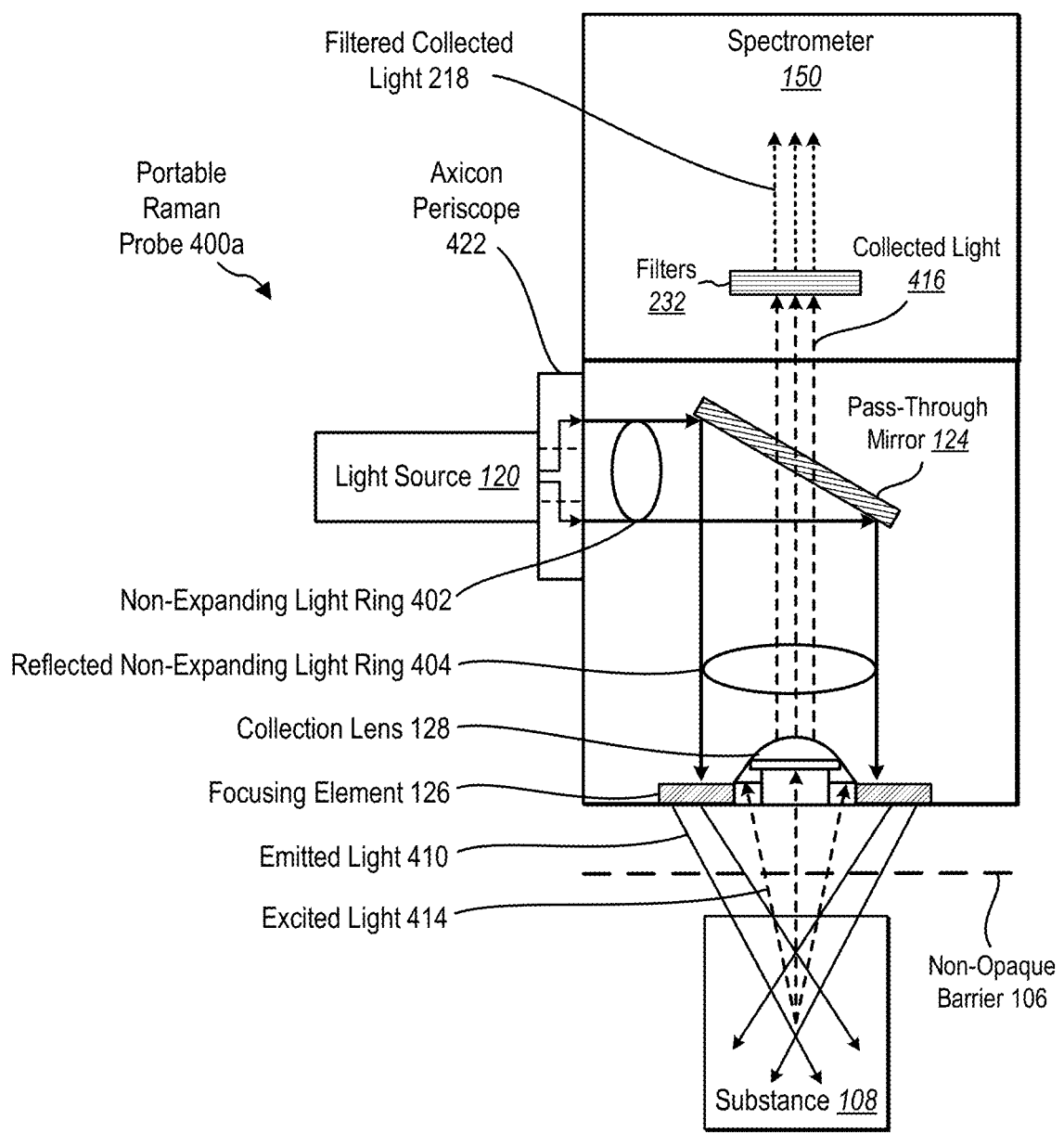
FIGS. 4A-4C illustrate additional example diagrams of a portable Raman probe in accordance with one or more implementations.
Figure 4B:
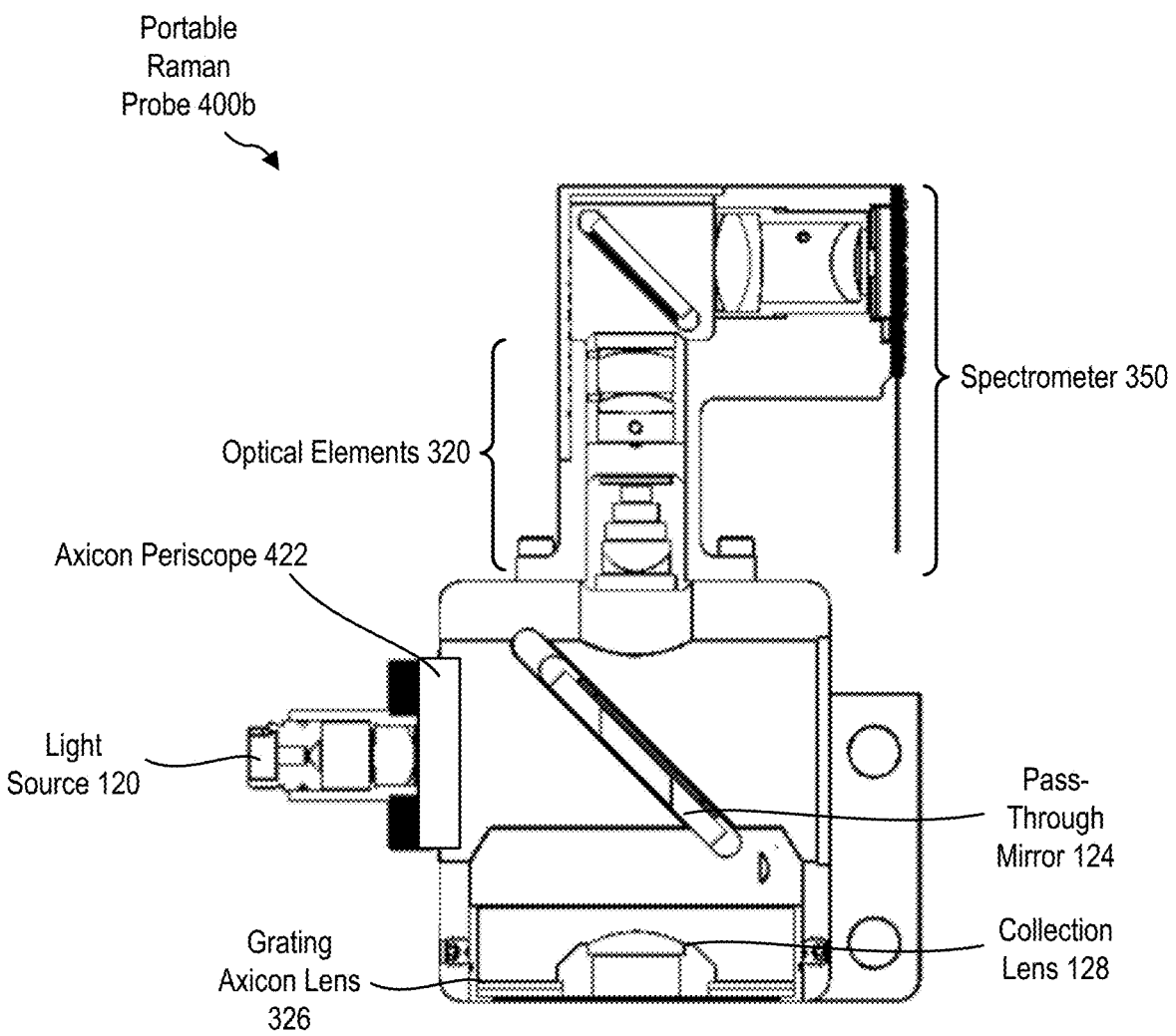
Figure 4C:
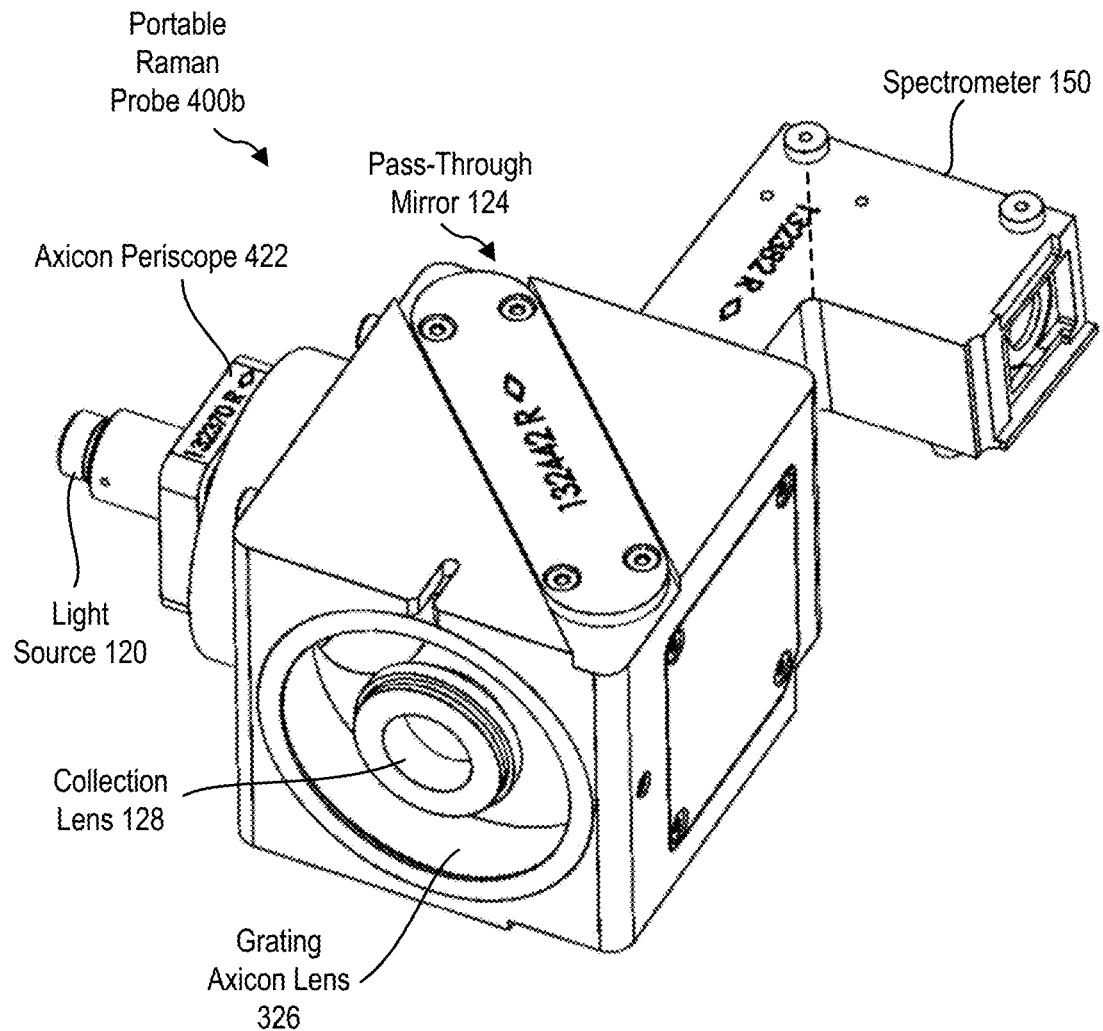

To illustrate, FIGS. 4A-4C show additional examples of a portable Raman probe in accordance with one or more implementations. For example, FIG. 4A includes a portable Raman probe 400a that includes many similar components to the portable Raman probes previously described. Notably, the portable Raman probe 400a includes an axicon periscope 422. In general, the axicon periscope 422 is a version of the light ring generator 122 that needs less physical space to create a light ring than with a single axicon. In many implementations, the axicon periscope 422 generates a non-expanding light ring 402, as shown. FIGS. 5A-5D provide detailed diagrams of axicon periscopes.

As shown, the light source 120 generates light, and the axicon periscope 422 converts the light to the non-expanding light ring 402. The non-expanding light ring 402 travels along a light path and reflects off the pass-through mirror 124 (shown as a reflected non-expanding light ring 404) and to the focusing element 126. As previously stated, the portable Raman probe 400a provides excitation light 410 through the non-opaque barrier 106 of a container to interact with the substance 108. Excited light 414 is generated from the interactions, and a portion of the excited light 414 is collected by the collection lens 128 of the portable Raman probe 400a. Also, as before, the collected light 416 travels through or past the pass-through mirror 124 along a light path to the filters 232 and then to the spectrometer 150 as the filtered collected light 218.

FIGS. 4B-4C show more schematic-based examples of the portable Raman probe 400a. For example, the portable Raman probe 400b shown in these figures is a portable Raman spectrometer probe with the axicon periscope 422 and other components, such as the light source 120, the pass-through mirror 124, the grating axicon lens 326 surrounding the collection lens 128, the optical elements 320, and the spectrometer 350.

In particular, FIG. 4B shows a two-dimensional representation of the portable Raman probe 400b, and FIG. 4C shows a three-dimensional model of the probe in an enclosed format. As shown in these figures, using the axicon periscope 422 greatly reduces the physical space of the probe by shortening the distance of the light path needed to generate a light ring of the same size.

As mentioned earlier, FIGS. 5A-5D provide detailed diagrams of axicon periscopes. In particular, FIGS. 5A-5D illustrate example diagrams of an axicon periscope that generates a light ring from a light source in accordance with one or more implementations. For simplicity, these figures include a light source and a light ring generator component while omitting other parts of a portable Raman probe. Additionally, these figures show a two-dimensional representation cut-out view. In various implementations, the axicon periscope is circular, square, or an in-between shape.

In general, an axicon periscope includes a pair of axicons (e.g., an interior lens and an exterior lens) that cooperate to generate a collimated light beam/ring of light. For instance, a pair of axicons are used to change the diameter of an axicon ring (e.g., light ring) and, in some instances, make the ring propagate with a constant diameter. By using a pair of reflective axicons, a portable Raman probe can generate a light ring with a relatively flat volume.

Figure 5A:
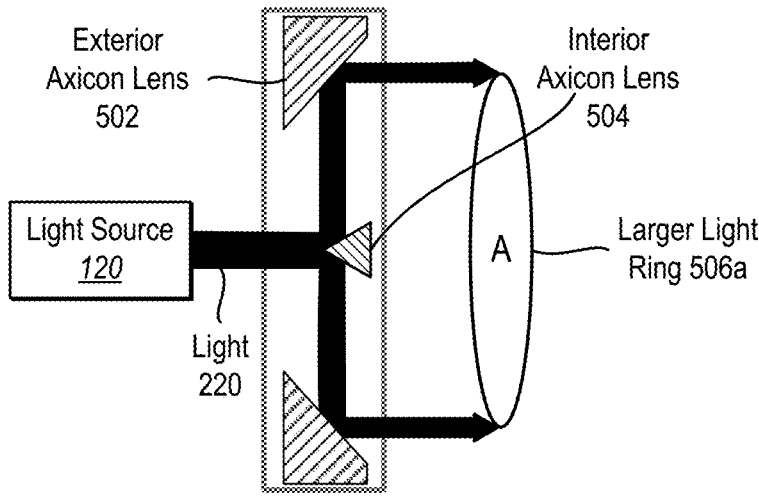
FIGS. 5A-5D illustrate example diagrams of an axicon periscope that generates a light ring from a light source in accordance with one or more implementations.

To illustrate, FIG. 5A includes an axicon periscope 522a. The axicon periscope 522a includes an exterior axicon lens 502 and an interior axicon lens 504. For example, the exterior axicon lens 502 is conical-shaped with an angled reflective inside edge (e.g., a conical reflector) and the interior axicon lens 504 is a cone with a reflective outside edge (e.g., a reflector cone). In one or more implementations, the exterior axicon lens 502 and the interior axicon lens 504 generate total internal reflection (TIR) with incoming light beams. Additionally, in various implementations, the interior axicon lens 504 is attached to a clear glass plate or lens that attaches to the exterior axicon lens 502 or the housing of a portable Raman probe.

As an example configuration, the exterior axicon lens 502 and the interior axicon lens 504 each have reflector angles of 45 degrees. Depending on the angles of the exterior axicon lens 502 and the interior axicon lens 504, a resulting light ring diameter can be constant (e.g., the two angles are the same), expanding (e.g., the second angle is larger), or contracting (e.g., the second angle is smaller). Additionally, in some examples, the diameter of the interior axicon lens

504 is 10 millimeters (mm), the diameter of the inside edge of the exterior axicon lens 502 is at least 26 mm to 29 mm, and the outside diameter of the exterior axicon lens 502 is 36 mm.

By shining light on the axicon periscope 522a, the axicon periscope 522a converts the light into a light ring. To illustrate, the light source 120 provides the light 220 to the interior axicon lens 504 of the axicon periscope 522a. The interior axicon lens 504 reflects the light 220 to the exterior axicon lens 502, which reflects the light outward to form a larger light ring, which is shown as a larger light ring 506a.

Figure 5B:
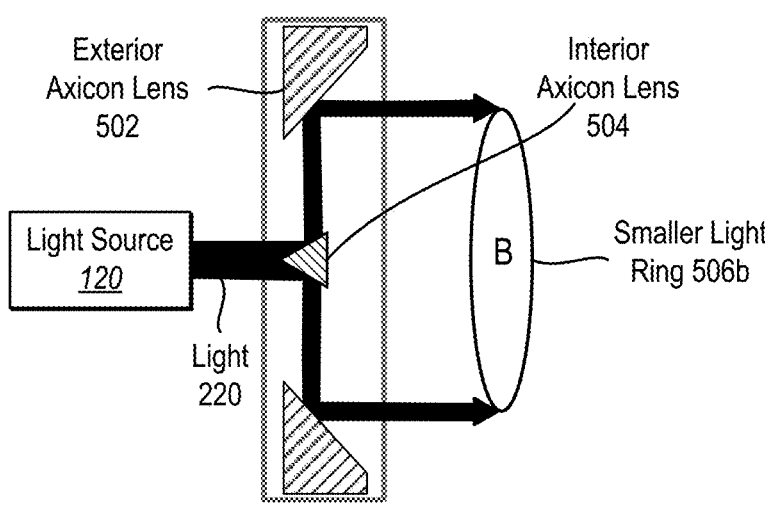

FIG. 5B shows how modifying the spatial location of the axicon pairs changes the diameter of the light ring. Indeed, the ring of light may change in diameter by moving the mirrors of the axicon axially (e.g., in and out) relative to each other. For example, a larger diameter axicon ring may be formed by moving the interior axicon lens 504 away from the light source 120 (and vice versa). To illustrate, the axicon periscope 522b in FIG. 5B moves the interior axicon lens 504 closer to the light source 120 (and/or the exterior axicon lens 502 farther away). As a result, the axicon periscope 522b generates a smaller light ring 506b.

Figure 5C:
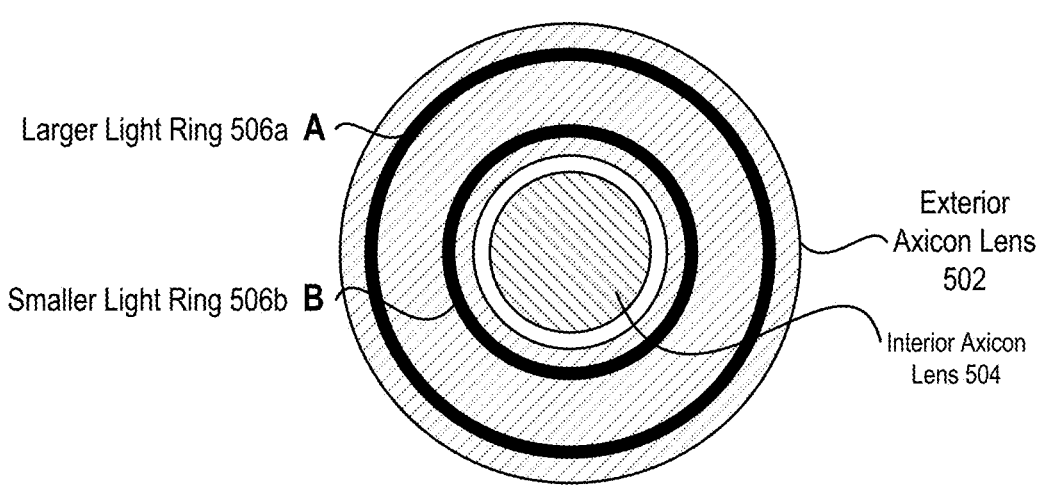

FIG. 5C shows a side view of an axicon periscope 522c having the exterior axicon lens 502, the interior axicon lens 504, where a viewer is looking from the side opposite the light source 120 (e.g., the viewer is looking at the bottom of the interior axicon cone). Based on the axial position of the axicon pairs the axicon periscope generates the larger light ring 506a (corresponding to FIG. 5A) or the smaller light ring 506b (corresponding to FIG. 5B). Indeed, the size of the light ring can be changed based on the position of the axicon pairs.

Figure 5D:
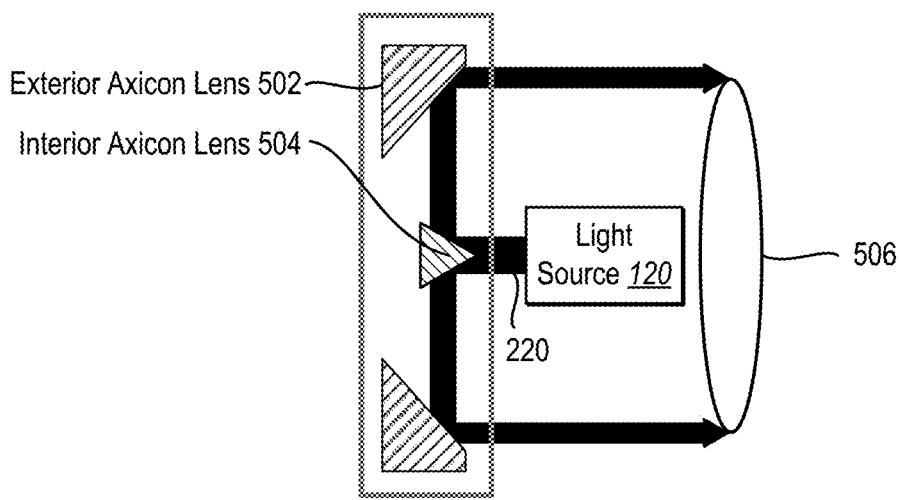

FIG. 5D shows another version of an axicon periscope 522d where the light source 120 is moved to the other side of the axicon periscope. In this implementation, the direction of the reflective surface on the interior axicon lens 504 is reversed when generating a light ring 506. This implementation may allow for a portable Raman probe to be further compacted by moving the light source 120 within the probe.

Figures 6A, 6B:
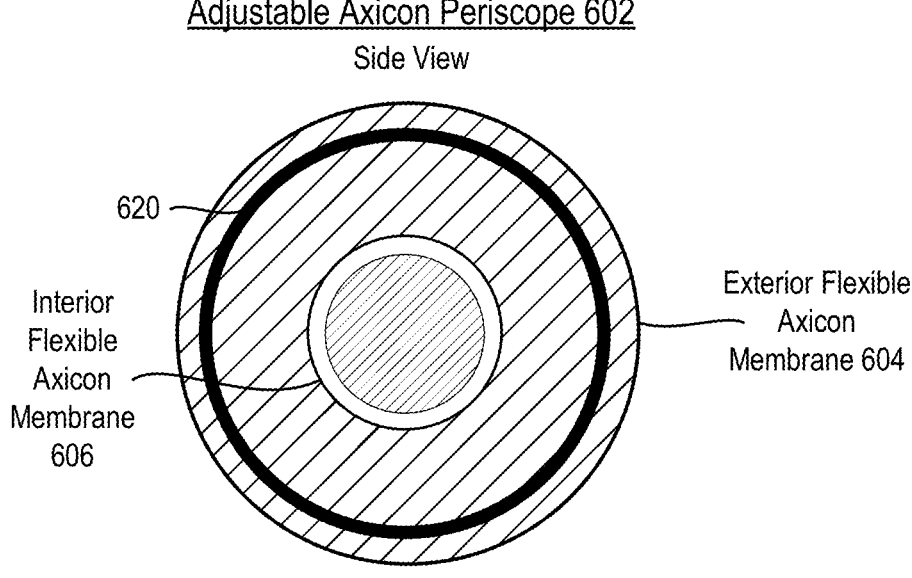
FIGS. 6A-6D illustrate example diagrams of adjustable axicon periscopes in accordance with one or more implementations.

FIGS. 6A-6D provide additional versions of an axicon periscope. In particular, FIGS. 6A-6D illustrate example diagrams of adjustable axicon periscopes in accordance with one or more implementations. For example, FIG. 6A is a cutout view of an axicon periscope 602 similar to the cutout view of FIG. 5A.

As shown, FIG. 6A includes the light source 120, an exterior flexible axicon membrane 604 and an interior axicon flexible membrane 606, which are similar to the interior axicon lens and the exterior axicon lens described above. Notably, the flexible membranes can be adjusted to change the relative position between the axicon pairs in the axicon periscope. For example, as shown, the exterior flexible axicon membrane 604 includes an adjustable exterior element 608 and the interior axicon flexible membrane 606 includes an adjustable interior element 610 (some implementations include only one of the adjustable elements). By moving one or both of the adjustable elements, the diameter of the light ring generated by the axicon periscope expands or contracts.

To further illustrate, FIG. 6A shows a light ring 620 having a first diameter based on a first set of positions of the adjustable exterior element 608 and the adjustable interior element 610. A front view of the light ring 620 is shown in FIG. 6B. When the axicon pairs are moved toward each other, the light ring 620 shrinks. Conversely, moving the axicon pairs apart grows the light ring 620. In some implementations, the diameter of the light ring 620 is adjusted by changing the angles of the interior axicon flexible membrane 606 and the exterior flexible axicon membrane 604.

As the light ring 620 changes in diameter, the focal point of emitted light outside of the portable Raman probe changes when paired with a focusing optic such as a graxicon. For example, a larger light ring creates a focal point further from the probe and vice versa for a smaller light ring. In this manner, the portable Raman probe can adjust the focal point of emitted light to accommodate different container thicknesses and/or placements of a sample substance.

In various implementations, one or both of the adjustable elements extend to the outside of a portable Raman probe. In some implementations, the portable Raman probe includes controls for manually adjusting the adjustable elements. In various implementations, the portable Raman probe automatically adjusts the adjustable elements. For example, upon getting an initial sample spectrum, the portable Raman probe automatically adjusts the diameter of the light ring to try to get a stronger reading.

Figure 6C:
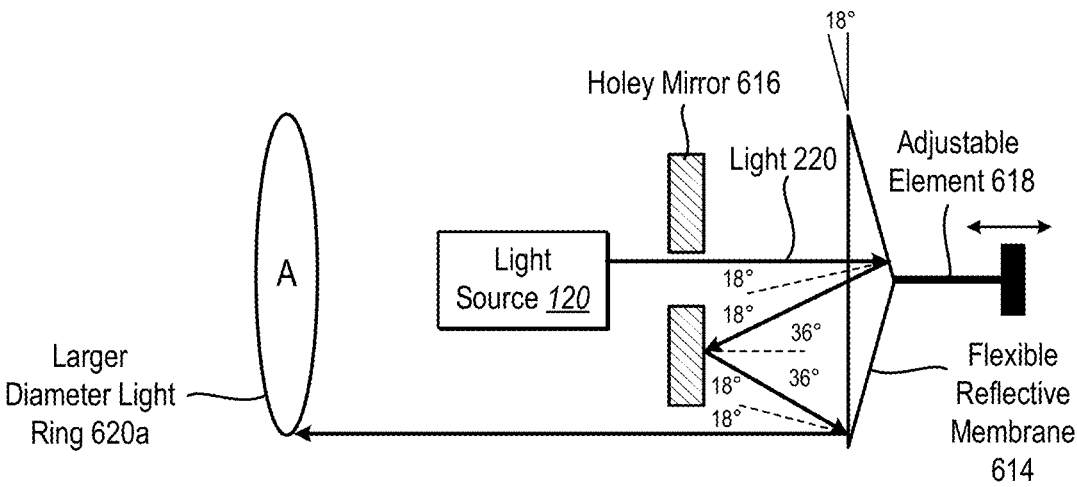
Figure 6D:
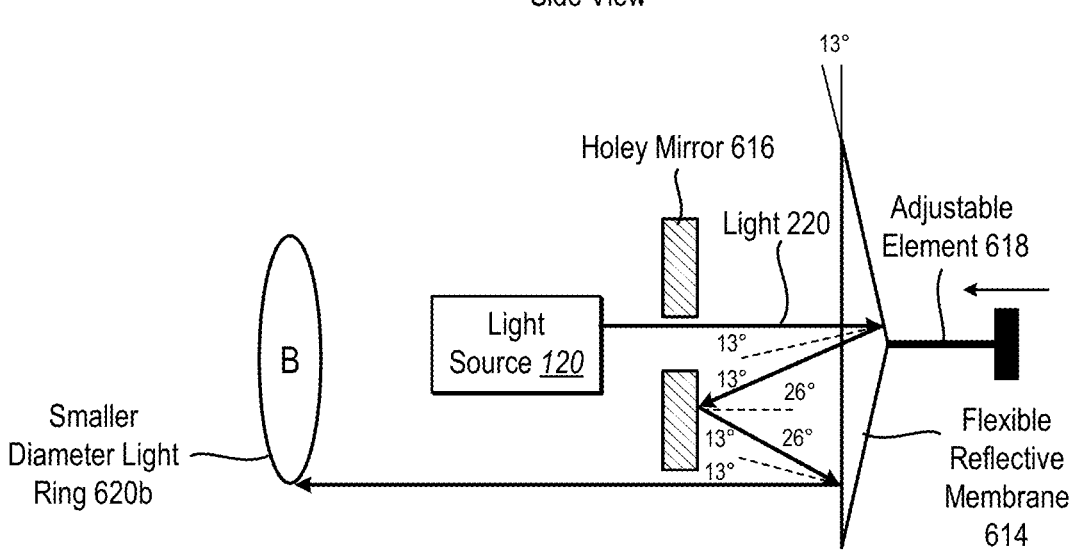

FIGS. 6C-6D show another version of an axicon periscope. To illustrate, FIGS. 6C-6D include the light source 120, a holey mirror 616, and a flexible reflective membrane 614 having an adjustable element 618.

In FIG. 6C, which shows an adjustable axicon periscope 602a in a first configuration, the light source 120 shines light 220 through a hole or lens in the holey mirror 616 towards the flexible reflective membrane 614. The light 220 reflects off one part of the flexible reflective membrane 614, off the holey mirror 616, then off a second part of the flexible reflective membrane 614 (e.g., a second location on the same interior surface) to generate the larger-diameter light ring 620a.

FIG. 6D shows an adjustable axicon periscope 602b in a second configuration. For example, upon changing the position of the adjustable element 618, such as moving it closer to the light source 120, as shown in FIG. 6D, the surface angles of the flexible reflective membrane 614 change. Accordingly, while the light 220 goes through the same reflections between the flexible reflective membrane 614 and the holey mirror 616, the reflection angles change because of the modifications to the flexible reflective membrane 614, as shown. Accordingly, moving the flexible reflective membrane 614 closer to the light source 120 via the adjustable element 618 results in a smaller-diameter light ring 620b, as shown in FIG. 6D.

Figure 7A:
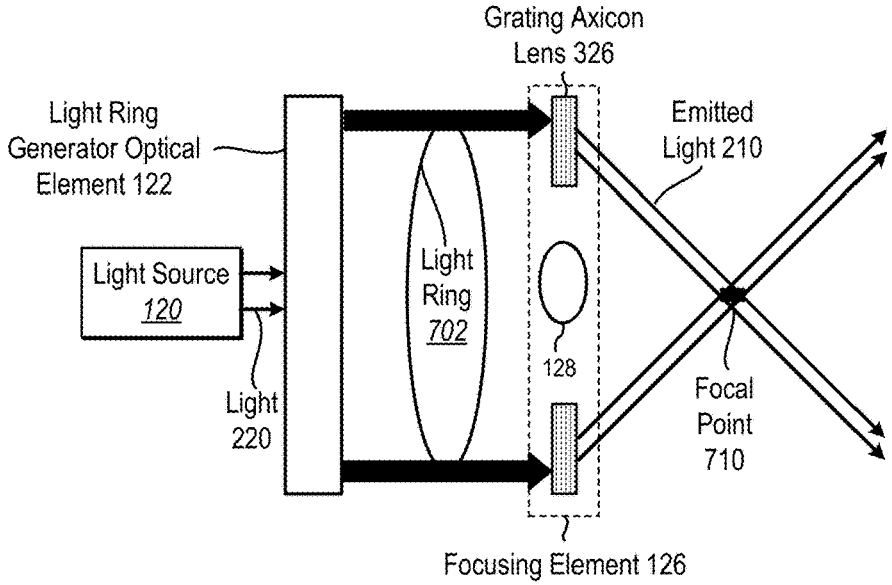
FIGS. 7A-7C illustrate example diagrams of focusing elements that direct light to emit toward a focal point outside of the portable Raman probe in accordance with one or more implementations.
Figure 7B:
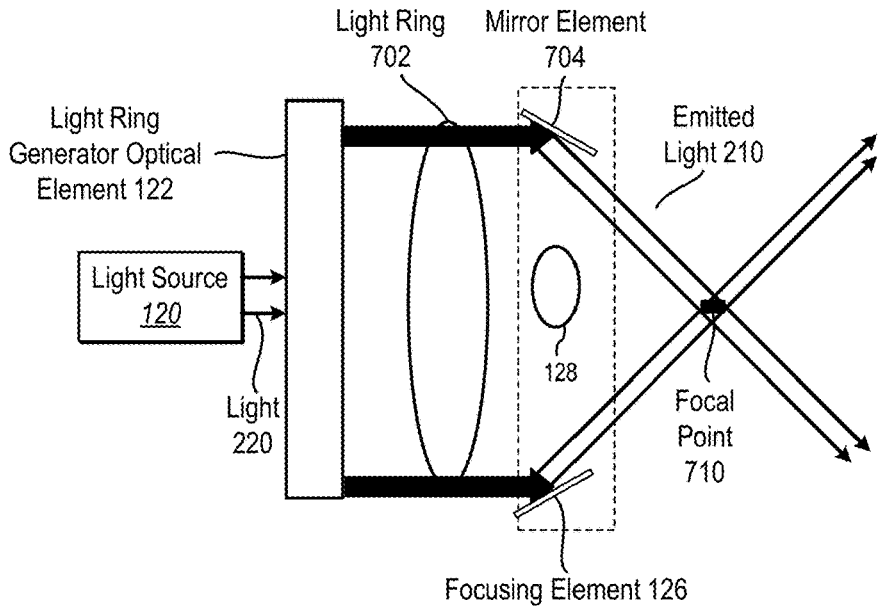
Figure 7C:
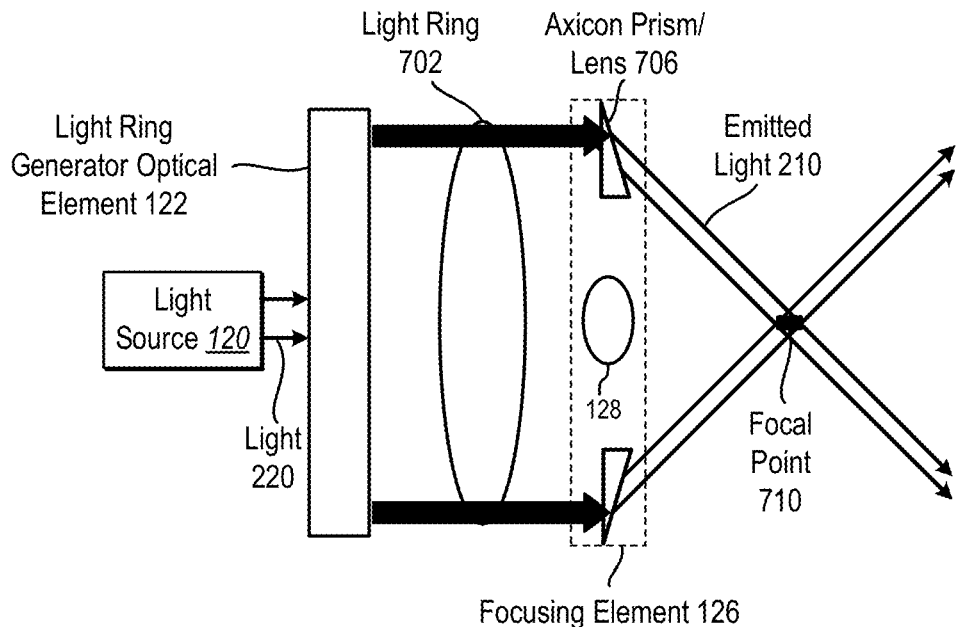

As mentioned above, FIGS. 7A-7C and 8A-8D provide more detail regarding focusing elements of a portable Raman probe. In particular, FIGS. 7A-7C illustrate example diagrams of focusing elements that direct light to emit towards a focal point outside of the portable Raman probe. For example, FIG. 7A shows a diffractive focusing element, FIG. 7B shows a reflective focusing element, and FIG. 7C shows a refractive focusing element. Each of these figures includes the light source 120 that generates light 220, a light ring generator 122 that generates a light ring 702 (e.g., an expanding or non-expanding light ring), and travels along a light path to a focusing element 126 with the collection lens 128. Other components, such as mirrors and lenses, are omitted for simplicity.

As previously mentioned, FIG. 7A shows a diffractive focusing element 700a. An example of this type of focusing element is the grating axicon lens 326 introduced earlier. As shown in the simplified illustration, the light ring 702 interacts with the grating axicon lens 326 to direct emitted light 210 towards a focal point 710. In some implementations, the focal point 710 is a Bessel beam which is sometimes called a "needle focus" because it is long and narrow. This focal point corresponds to the location where a sample substance behind a non-opaque barrier of a container is expected to be. In various implementations, the focal point 710 is 20 mm from the exit surface of the focusing element (e.g., grating axicon).

Figure 8A:
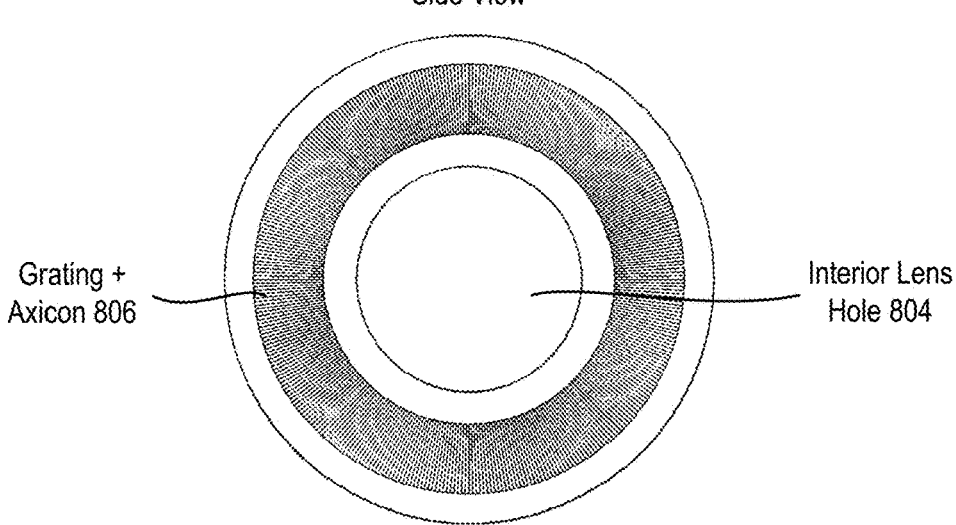
FIGS. 8A-8D illustrate example diagrams of a grating axicon that directs light to emit toward one or more focal points outside of the portable Raman probe in accordance with one or more implementations.
Figure 8B:
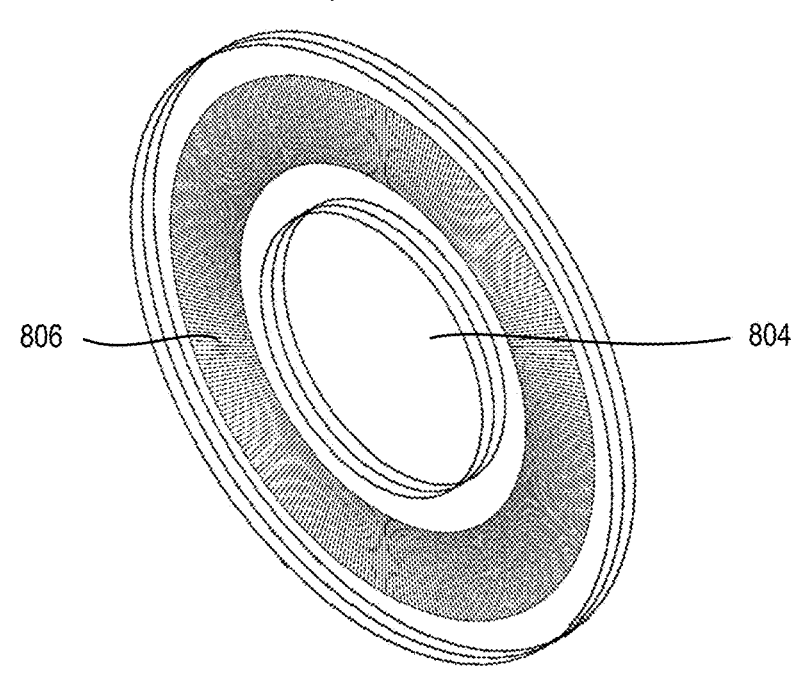

One advantage of the grating axicon lens 326 is its compact size. In many instances, a grating axicon lens is 2 mm or less in thickness. This provides a minimal footprint while still providing a powerful function of redirecting the light ring 702 to the focal point 710. FIGS. 8A-8B provide additional visual examples of a grating axicon lens.

As previously mentioned, FIG. 7B shows a reflective focusing element 700b. An example of this type of focusing element is a reflective element 704 (e.g., a mirror element such as an axicon mirror). For example, the reflective element 704 is a donut-shaped ring element with an inside surface angled to redirect incoming light. As shown, the light ring 702 interacts with the reflective element 704 to direct the emitted light 210 towards a focal point 710. In many implementations, the reflective element 704 requires more physical space in the probe than the grating axicon lens 326.

As mentioned, FIG. 7C shows a refractive focusing element 700c. An example of this type of focusing element is an axicon prism/lens 706. For example, the axicon prism/lens 706 is a donut-shaped ring axicon element with an outside surface angled to accept and redirect incoming light. As shown, the light ring 702 interacts with the axicon prism/lens 706 to direct the emitted light 210 towards a focal point 710. In many implementations, the axicon prism/lens 706 and the reflective element 704, in particular, require more physical space in the probe than the grating axicon lens 326.

FIGS. 8A-8D illustrate example diagrams of a grating axicon that directs light to emit toward one or more focal points outside of the portable Raman probe in accordance with one or more implementations. To illustrate, FIG. 8A shows a side view of a grating axicon lens 802. As shown, the grating axicon lens 802 includes the grating axicon 806 and the interior hole 804. The grating axicon 806 directs and/or focuses an incoming light ring as described. The interior hole 804, which may be a hole or a clear lens, is centrally located to allow for the coaxial positioning of collection optics (e.g., the collection lens). In one example, the grating axicon lens 802 is 42 mm in diameter, the grating axicon 806 ranges from 37 mm to 25 mm in diameter (or from 36 mm to 26 mm, etc.), the interior hole 804 is around 20 mm in diameter, and the grating axicon lens thickness is 2 mm.

FIG. 8B shows a perspective view of the grating axicon lens 802, highlighting its thinness and compactness. In various implementations, the grating axicon lens 802 includes two glass lenses with a diffraction grating sandwiched in between to form the grating axicon lens.

In addition to its compact thinness, the grating axicon lens 802 allows for the portable Raman probe to apply different focusing characteristics. For example, a grating axicon lens can be encoded to incorporate additional optical functions that are not axiconic in nature, such as producing different illumination patterns of holographic optical elements (e.g., a ring, a star, lines, points). To further illustrate, FIGS. 8C-8D provide examples of different illumination patterns.

Figure 8C:
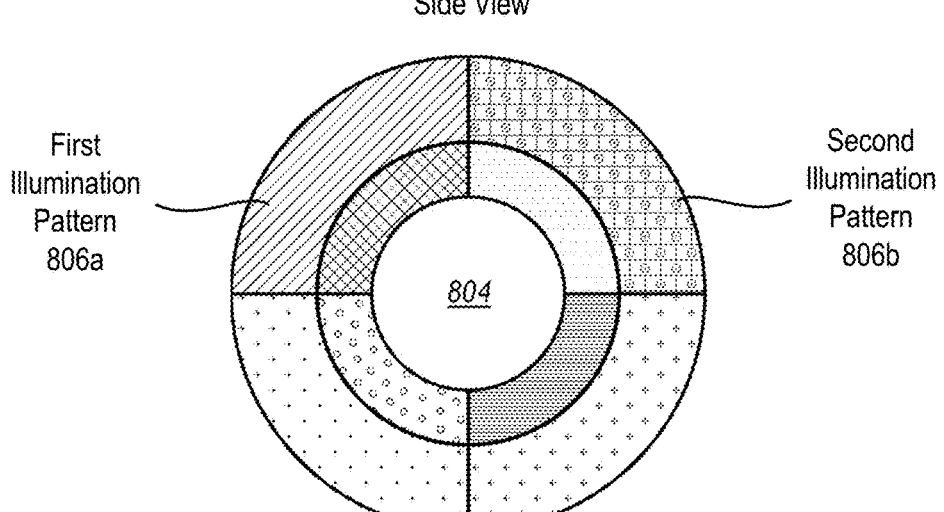
Figure 8D:
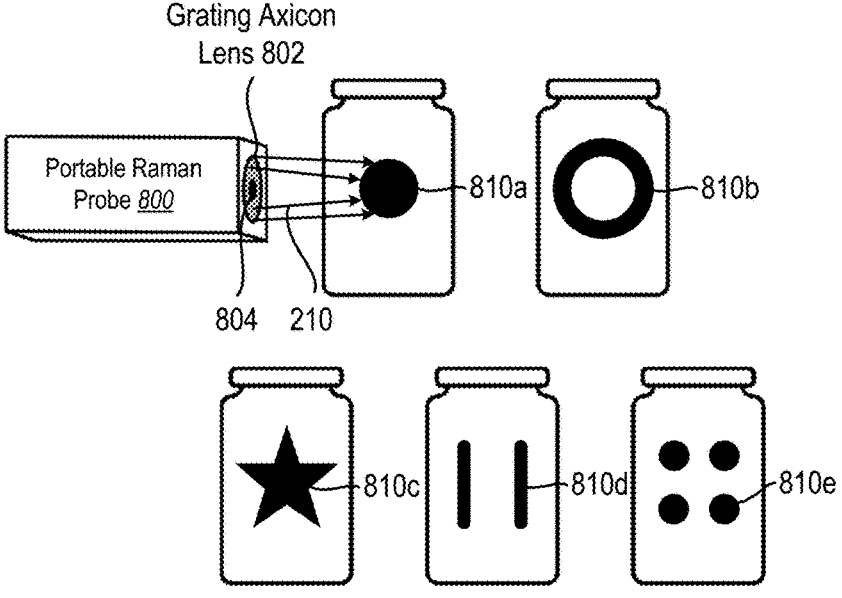

In particular, FIG. 8C shows a side view of the grating axicon lens 802a with different illumination patterns as well as the interior hole 804. For example, the grating axicon lens 802a is divided into multiple zones, where each zone has a different focusing characteristic. To illustrate, the grating axicon lens 802a includes multiple zones with multiple illumination patterns including a first zone with a first illumination pattern 806a and a second zone with a second illumination pattern 806b.

In various implementations, the different illumination patterns cause the portable Raman probe to emit light in a customized manner. To illustrate, FIG. 8D shows different examples of illumination pattern profiles 820 created by mixing and matching illumination patterns across zones of a grating axicon lens.

As shown in FIG. 8D, a portable Raman probe 800 with a grating axicon lens 802 (i.e., "graxicon") having the interior hole 804 generates different versions of the illumination pattern profiles 820 (e.g., holographic fields). Examples of these profiles include a focal point or dot 810a, a ring 810b, a star 810c, lines 810d, and multiple points 810e. The illumination pattern profiles 820 can be adjusted to better penetrate a container's barrier (e.g., based on material, shape, thickness, color, etc.) and/or interact with a forecasted substance in a container (e.g., based on material, matter type, chemical compounds, viscosity, etc.).

Other potential advantages of this approach include using a holographic optical element to collimate the incoming light as well as directing it toward the focusing optic. In some instances, this eliminates the need for traditional collimation optics after the laser. Additionally, this approach allows for more precise control over the light being directed toward the sample, resulting in improved accuracy and efficiency of the portable Raman probe.

As mentioned above, FIG. 9 provides additional examples of a portable Raman probe. In particular, FIG. 9 illustrates example diagrams of portable Raman spectrometer probes in accordance with one or more implementations. These figures show that components of the portable Raman probe can be added, removed, and/or moved in various configurations.

To illustrate, FIG. 9 shows a portable Raman probe 900a (e.g., a portable Raman spectrometer probe) and the substance 108 behind a non-opaque barrier 106. Additionally, the portable Raman probe 900a includes various components previously introduced, such as the light source 120, the axicon periscope 522, the grating axicon lens 326 with the collection lens 128, a reflector mirror 910, and the spectrometer 150.

As shown, the portable Raman probe 900a is configured to not require a pass-through mirror. Indeed, the light source 120 and the axicon periscope 522 are opposite the grating axicon lens 326 and generate a light ring that travels along the first light path 902 directly from the axicon periscope 522 to the grating axicon lens 326 (or another type of focusing element). The emitted light 210 and the excited light 214 then act as previously described, where the excited light 214 is collected at the collection lens 128 and provided via a second light path 918 via the reflector mirror 910 to the spectrometer 150. As noted, the spectrometer 150 includes an entrance slit wither Raman emissions coming from the connection lens will not enter but fall outside of the entrance slit.

In various implementations, rather than including the spectrometer 150, the portable Raman probe 900a includes a mirror in place of the grating 330 and reflects the spectrum of the substance 108 to an external device. In one or more implementations, the portable Raman probe 900a provides the raw spectrum to the external device. In some implementations, the portable Raman probe 900a pre-filters and/or trims the spectrum before providing it.

Figure 10A:
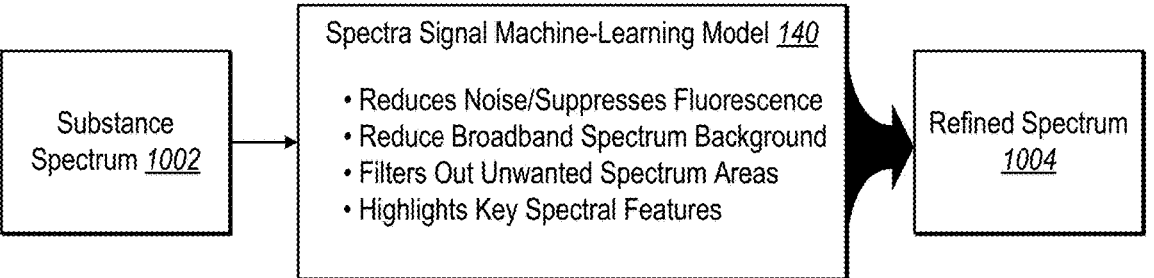
FIGS. 10A-10D illustrate example diagrams of a spectra refinement machine-learning model in accordance with one or more implementations.
Figure 10B:
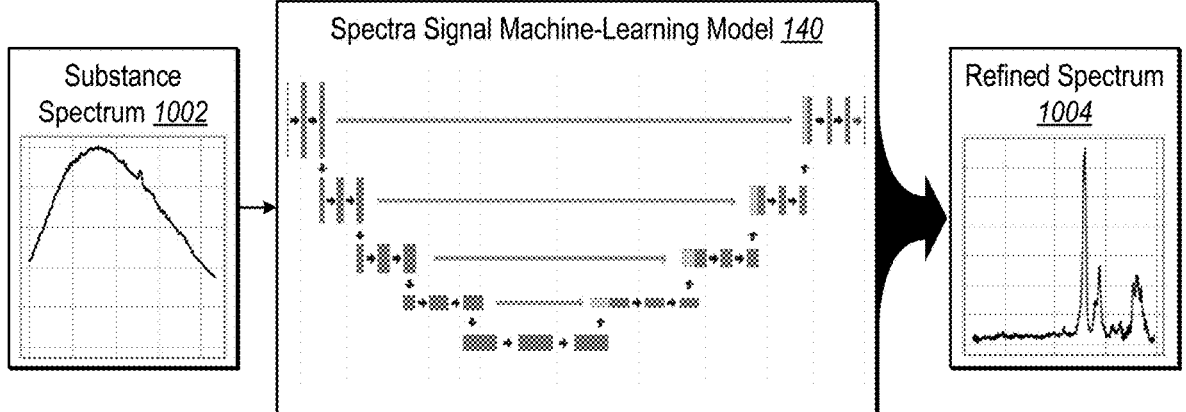
Figure 10C:
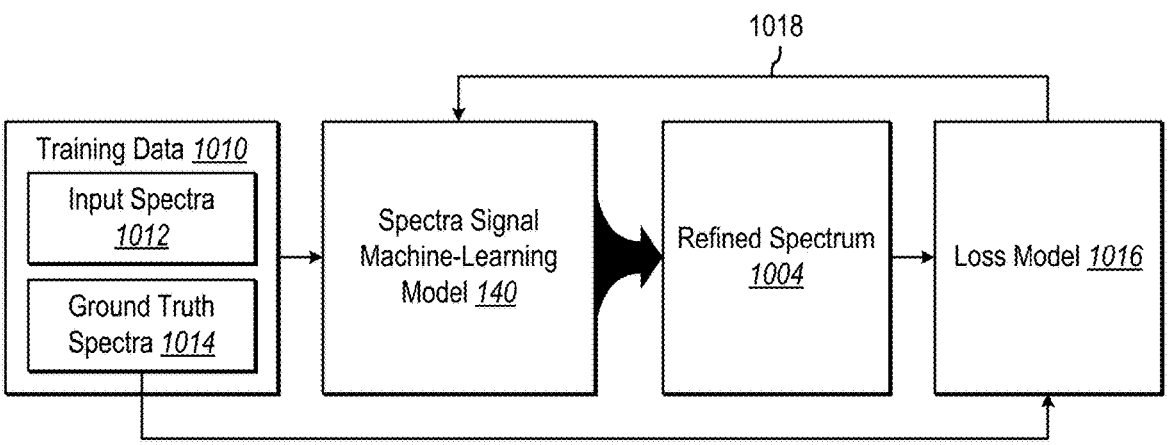
Figure 10D:
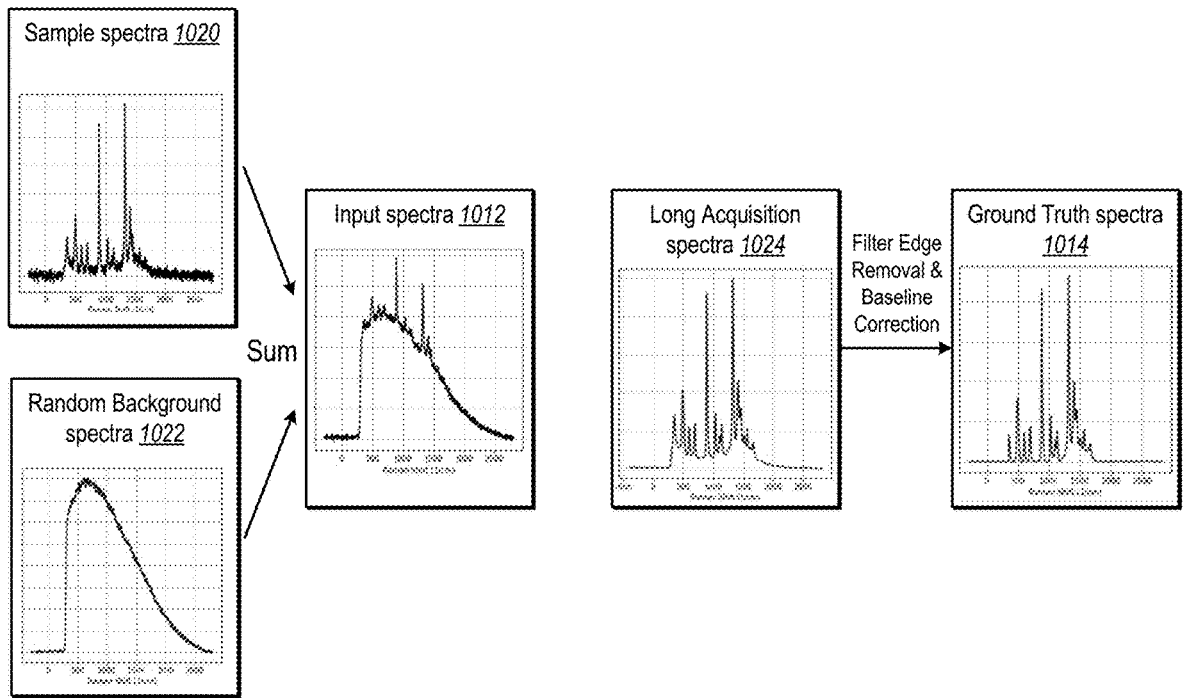

FIGS. 10A-10D illustrate example diagrams of a spectra refinement machine-learning model in accordance with one or more implementations. In particular, FIG. 10A shows an example block diagram of the spectra refinement machine-learning model 140. FIG. 10B shows a visual example of an input and output of the spectra refinement machine-learning model 140. FIG. 10C shows an example block diagram of training the spectra refinement machine-learning model 140. FIG. 10D shows examples of generating training data for the spectra refinement machine-learning model 140.

As mentioned, the spectra refinement machine-learning model 140 generates a refined spectrum of a sample substance from a raw and/or pre-filtered sample to enhance the spectrum quality and, in turn, improve spectrum analysis by a spectrometer. To illustrate, FIG. 10A includes the spectra refinement machine-learning model 140, a substance spectrum 1002, and a refined spectrum 1004. For example, the substance spectrum 1002 associated with the sample substance in a container is provided to the spectra refinement machine-learning model 140, which generates the refined spectrum 1004 for the sample substance.

In various implementations, the spectra refinement machine-learning model 140 is trained to reduce noise in the spectrum learning to separate out different types of noise and interference. Additionally, the spectra refinement machine-learning model 140 isolates spectral contributions of Raman features (e.g., spectral peaks) by cleaning up the peaks. In this manner, the spectra refinement machine-learning model 140 is trained to generate refined spectra that are more accurate, clear, reliable, and usable.

To elaborate, the spectra refinement machine-learning model 140 in FIG. 10A mentioned that the model reduces noise and suppresses fluorescence. For example, the spectra refinement machine-learning model 140 is trained to reduce general noise affecting the substance spectrum 1002. In addition, the spectra refinement machine-learning model 140 removes broadband background fluorescence, spectrum, or signals that obscure sharp spectral peaks, detector signal patterns, and/or optical etaloning. Additionally, the spectra refinement machine-learning model 140 removes, reduces, and/or eliminates unwanted noise, such as fast noise or fast microscope scans, in an input sample.

As another example, the spectra refinement machine-learning model 140 is trained to eliminate less significant parts of the substance spectrum 1002. For example, the spectra refinement machine-learning model 140 learns to determine the starting edge or starting spectral location. Based on this edge, the spectra refinement machine-learning model 140 cuts off unnecessary portions of a spectrum. Similarly, the spectra refinement machine-learning model 140 removes the top-end portions of the spectrum that it learns are not essential for analysis. In this way, the spectra refinement machine-learning model 140 learns to filter out unwanted spectrum areas as part of its training and, therefore, learns to accurately highlight key Raman spectral features.

In various implementations, by improving the quality of the sample spectra of substances, the spectra refinement machine-learning model 140 allows for more precise identification of unknown samples. For example, a cleaner, refined spectrum better aligns with matching spectra indexed in a library of known spectra (e.g., higher-quality spectra). Additionally, by outputting higher quality, refined spectra, the spectra refinement machine-learning model 140 allows for identifying multiple components in a sample via mixing spectra analysis, improved pass/fail decision of whether the substance is a particular composition, improved quantitative analysis (e.g., better able to detect concentrations of an analyte in the sample), and improved quality control validation of the sample substance.

Upon training the spectra refinement machine-learning model 140, which is described below, researchers found that the correlation scores for the refined spectra were significantly higher than traditional baseline correction pre-processing approaches. Additionally, the model provided much cleaner spectra while preserving key Raman features. The model also allowed for samples with higher background levels and/or noise to be used for further analysis and identification.

In various implementations, the spectra refinement machine-learning model 140 resides with a portable Raman probe. For example, a trained version of the model is stored on a memory chip or device and/or executed by a microprocessor on a portable Raman probe. In alternative implementations, the model is located on an external computing device. For instance, the model and the analysis portion of a spectrometer are located on a laptop device that communicates with a portable Raman probe collecting the sample substance.

As mentioned, FIG. 10B shows a visual example of an input and output of the spectra refinement machine-learning model 140. In particular, FIG. 10B includes the substance spectrum 1002, the spectra refinement machine-learning model 140, and the refined spectrum 1004, introduced above.

As shown, the substance spectrum 1002 includes an example image of a raw spectrum of a sample substance. As shown, the image of the substance spectrum 1002 does not include any clear sharp peaks but rather is filled with background and other noise. Additionally, the refined spectrum 1004 generated by the spectra refinement machine-learning model 140 includes an image of the refined spectrum of the sample substance. In contrast, the refined spectrum 1004 highlights Raman features of the substance by showing multiple clear spectral peaks and/or removing noise and less relevant portions (e.g., the bottom end) of the spectrum. Indeed, a noisy and unusable substance spectrum becomes a clean and useful refined spectrum with the spectra refinement machine-learning model 140.

In various implementations, the spectra refinement machine-learning model 140 is a neural network with a U-Net architecture that includes convolutional layers, rectifiers or rectified linear unit (ReLU) activation functions, element-wise sum operations, max pooling, pixel shuffle up-sampling, and/or concatenation. In some implementations, the model trains two million parameters that correspond to Raman characteristics and features. In one or more implementations, the model processes a 1-dimensional data set (e.g., the spectrum) where the initial input dimensions are around ~2200 pixels, the fully encoded level encodes ~512 different features in 128 spatial locations, and the reconstructed/refined spectrum that is output is trimmed to ~1800 pixels (or trimmed to not exceed the input range).

As mentioned, FIG. 10C shows an example block diagram of training the spectra refinement machine-learning model 140. In general, the spectra refinement machine-learning model 140 is trained to reduce or condense the spectrum down to key Raman features and then rebuild a refined spectrum focusing on these key Raman features.

To illustrate, FIG. 10C includes training data 1010 having input spectra 1012 and ground truth spectra 1014. In various implementations, the input spectra 1012 in the training data 1010 correspond to a set of ground truth spectra 1014. For example, in one or more implementations, the training data

1010 includes training pairs having an input spectrum and a corresponding ground truth spectrum. Additional details regarding training pairs are provided below in connection with FIG. 10D.

FIG. 10C also includes a loss model 1016 that provides feedback 1018 to the spectra refinement machine-learning model 140 during training, as described below. In some instances, the loss model 1016 includes one or more loss functions, and the loss functions of the loss model 1016 are used to train the spectra refinement machine-learning model 140. To illustrate, a given input spectrum from a given training pair is provided to the spectra refinement machine-learning model 140, which generates a refined spectrum 1004. The refined spectrum 1004 is provided to the loss model 1016, which compares it against a given ground truth spectrum from the given training pair. For example, the loss model 1016 determines an error or loss amount based on comparing differences between how well the spectra refinement machine-learning model 140 performed (e.g., the refined spectrum 1004 for a given input spectrum) and how well it should be performing (e.g., the ground truth spectra 1014 corresponding to the given input spectra). The loss model 1016 then provides feedback 1018 indicating the error or loss amount to the model, which the model utilizes to tune and improve.

In various implementations, the spectra refinement machine-learning model 140 is trained and optimized using the loss amount via backpropagation and/or end-to-end learning and by tuning and modifying network layers of the model. For instance, the loss model 1016 back-propagates the loss amount via the feedback 1018 to tune the parameters of the spectra refinement machine-learning model 140. In this manner, the model is iteratively tuned and trained to learn a set of best-fit parameters that accurately generate the refined spectra from raw and/or pre-filtered input spectra.

In some implementations, the spectra refinement machine-learning model 140 is trained until it converges or for a given number of training cycles (e.g., 3,000). In various implementations, different spectra (or versions of spectra) are provided in each training cycle. For example, in one or more implementations, spectrum data is augmented with different variations to train the model to be robust when facing unknown sample spectra.

Additionally, during training, various parameters affecting the input spectra 1012 can be applied. For example, the parameters of time integration, laser power levels, gain settings, and others can be adjusted and varied to improve training robustness. Further, the training may include a training portion and a validation portion. Also, training may include tests on real, known sample substances to validate the accuracy of the model. Indeed, through validation and testing, researchers found that the spectra refinement machine-learning model 140 provides statistically accurate and useful results for a wider range of background levels than conventional systems.

As mentioned above, FIG. 10D provides additional details regarding generating training pairs for the training data 1010. In particular, FIG. 10D shows examples of generating training data for the spectra refinement machine-learning model 140.

As shown, FIG. 10D includes sample spectra 1020. In various implementations, the sample spectra 1020 are collected from samples of known substances. For example, different containers of substances are probed with a portable Raman probe to generate the sample spectra 1020. In various implementations, the sample spectra 1020 are sampled for shorter amounts of time (e.g., a few seconds) matching real-world sampling conditions taken from different types of containers having different types of non-opaque barriers.

Additionally, FIG. 10D includes random background spectra 1022 (e.g., noise). For example, random noise including background broadband fluorescence and unwanted noise is generated as part of generating training data. The training spectra are then combined to generate the input spectra 1012. In particular, some or all of the random background spectra 1022 are added to the sample spectra 1020 to generate the input spectra 1012 to obscure the spectra with noisy conditions expected in real-world use. In various implementations, the random background spectra 1022 is only applied to some of the sample spectra 1020, such as half of the samples.

In some implementations, the input spectra 1012 are further augmented to increase training robustness. As one example, the input spectra 1012 are augmented by extending the spectra on one or both ends through mirroring. As another example, the input spectra 1012 are augmented by randomly altering the spectral shape with shifts, extensions, warps, shading, flips, interpolations, and/or reflections. In particular, though augmented to change the exact details of the spectra, the Raman-look of the input spectra 1012 is kept intact. In various implementations, the input spectra 1012 are augmented such that no two training spectra are identical or alike.

FIG. 10D also includes long acquisition spectra 1024 (e.g., high-quality spectra). For example, the portable Raman probe takes measures of the same sample substances for a longer time period, such as one, two, or more minutes. In this manner, the portable Raman probe gathers a more realistic reading of the sample. In addition, in various implementations, the long acquisition spectra 1024 are preliminarily processed, such as by applying a filter spectrum edge removal and baseline correction, to generate the ground truth spectra 1014. Indeed, the ground truth spectra 1014 are based on the long acquisition spectra 1024 and often are cleaner versions. Further, according to one or more implementations, augmentation is performed in parallel with the input spectra 1012 to keep peaks aligned and in sync.

Figure 11:
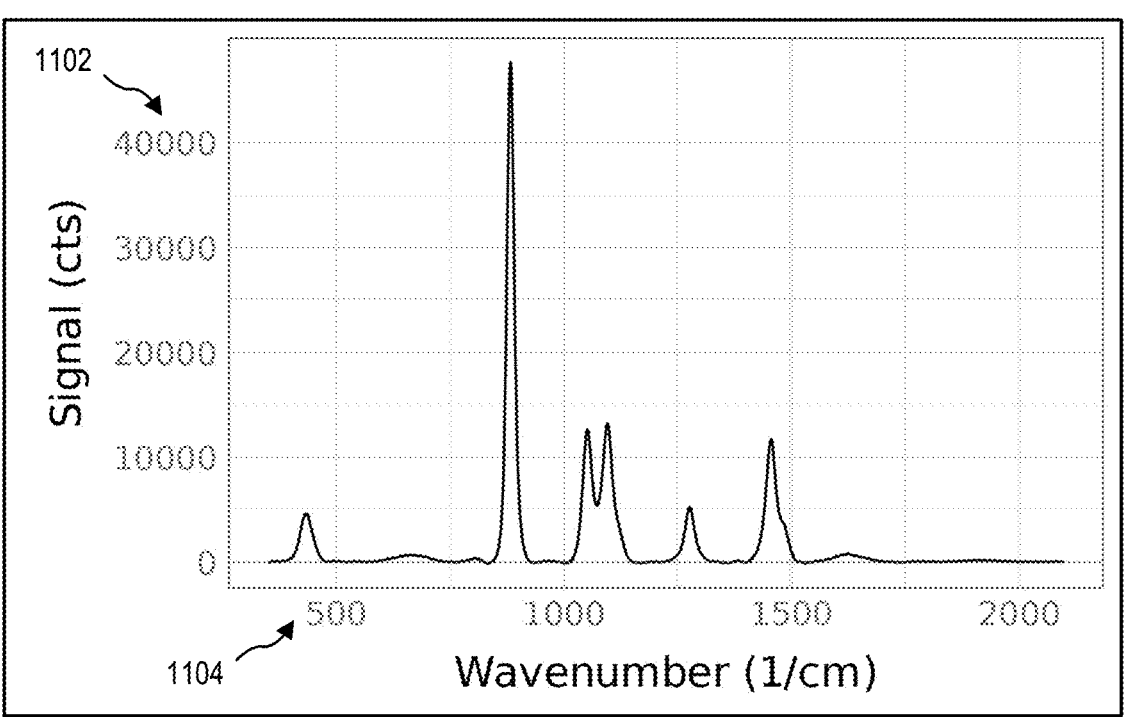
FIG. 11 illustrates an example diagram of a spectrum of a substance within a container gathered utilizing the portable Raman probe in accordance with one or more implementations.

FIG. 11 illustrates an example diagram of a spectrum of a substance within a container gathered utilizing the portable Raman probe with a spectra refinement machine-learning model in accordance with one or more implementations. As shown, FIG. 11 includes spectral analysis output 1100. In various implementations, the spectral analysis output 1100 is displayed on a mobile device or another type of client device. In some implementations, the spectral analysis output 1100 is displayed by a portable Raman probe, as described above. As shown, the spectral analysis output 1100 includes a signal measurement 1102 (e.g., continuous time signals (CTS)) for the y-axis and wavenumber 1104 (e.g., wavelength) on the x-axis.

In various implementations, the spectral analysis output 1100 is used for comparison against known substances. For example, comparing the spectral analysis output 1100 to a library of known substances reveals that the sample substance tested is a particular type of ethanol. In some implementations, the portable Raman probe can identify and/or confirm a substance based on the spectral analysis output 1100 provided by the spectra refinement machine-learning model.

As mentioned above, the portable Raman probe provides a smaller-scale, portable version of a Raman probe, which has not yet been achieved by conventional systems. Additionally, the portable Raman probe reduces background fluorescence and unwanted noise by using specialized focusing elements and/or machine learning model processes. Further, the specialized focusing elements allow for emitted light and signals to pass through the barrier and reflect back an excited signal to the portable Raman probe while, in some instances, deflecting some or most of the scattered fluorescence from the container barrier away from the probe. Indeed, the portable Raman probe is designed to facilitate improved fluorescence suppression (e.g., often the largest of the noises) by reducing fluorescence captured from the barrier, which improves the quality of the native spectra.

The portable Raman probe combined with the spectra refinement machine-learning model also enables lower laser power than conventional systems as the model generates refined spectra from lower-quality input spectra. Additionally, the portable Raman probe can obtain spectra for sample substances through lower acquisition times than conventional systems (e.g., shorter sample scan times) as the spectra refinement machine-learning model cleans "dirty" samples into refined spectra.

Similarly, with refined spectra, the portable Raman probe requires less power and/or less battery as a result of quicker acquisition and processing times. Quicker scanning times also provide the benefit of improved accuracy as a user does not need to hold the portable Raman probe steady for as long.

FIGS. 12-14 illustrate flowcharts that demonstrate the use of a portable Raman probe to identify and collect substances within containers with non-opaque barriers. These figures show a series of steps for implementing this process, but alternative methods may include additional, omitted, or rearranged steps. The steps shown in FIGS. 12-14 can also be performed as part of a method, or through the use of instructions on a non-transitory computer-readable medium that is executed by a processor. In some cases, a system may also be used to perform these steps.

To illustrate, FIG. 12 corresponds to utilizing a spectrometer to detect substances stored in non-opaque containers. FIG. 12 shows an example series of acts for utilizing a portable Raman probe to identify the composition of a substance within a container having a non-opaque barrier in accordance with one or more implementations.

As shown, the series of acts 1200 includes an act 1210 of emitting a first light across a focusing element of a portable probe through a non-opaque barrier and onto a substance beyond the non-opaque barrier. For instance, the act 1210 may involve emitting a first wavelength range of light across a grating axicon of a portable spectrometer probe through a non-opaque barrier and onto a substance beyond the non-opaque barrier.

As further shown, the series of acts 1200 includes an act 1220 of receiving a second light at a collection lens of the portable probe where the focusing element surrounds the collection lens. For example, the act 1220 may involve receiving a second wavelength range of light at a collection lens of the portable spectrometer probe, where the collection lens is encircled by the grating axicon.

As further shown, the series of acts 1200 includes an act 1230 of passing the second light onto a detector. For example, the act 1230 may include passing the second wavelength range of light through a grating within the portable spectrometer probe that diffracts the second wavelength range onto a detector.

As further shown, the series of acts 1200 includes an act 1240 of providing results of the detector to reveal a composition of the substance. For example, the act 1240 may involve providing processing results based on the second wavelength range of light collected at the detector to reveal a composition of the substance beyond the non-opaque barrier.

The series of acts 1200 can include additional acts in various implementations. For example, in some implementations, the series of acts 1200 includes splitting a light having the first wavelength range of light into a ring of light between a light source and the grating axicon within the portable spectrometer probe. In one or more implementations, the series of acts 1200 includes reflecting the ring of light off the surface of a pass-through mirror onto the grating axicon and around the collection lens, allowing a portion of the second wavelength range of light to pass through the pass-through mirror along a light path between the collection lens and the grating.

In one or more implementations, splitting a light includes utilizing an axicon to convert the light into the ring of light, where a diameter of the ring of light expands (e.g., the ring diameter being the distance across the ring from one edge to an opposite edge traveling across the center of the ring) as it travels away from the axicon while maintaining a same ring width. In one or more implementations, splitting a light includes utilizing a combination of axicon lenses that converts the light into the ring of light, where the ring of light is non-expanding as it travels away from the axicon lenses.

In various implementations, the portable probe is a portable Raman probe and/or a portable Raman spectrometer probe and includes a light source that generates an emitted light at a first wavelength range; a ring of light within the portable Raman probe based on the emitted light; a focusing element surrounding a collection lens, where the focusing element accepts the ring of light and directs the ring of light out of the portable Raman probe toward a focal point associated with a substance that is beyond a non-opaque barrier; and the collection lens that receives excited light at a second wavelength range reflected and refracted off the substance beyond the non-opaque barrier In one or more implementations, regarding the portable Raman probe, the focusing element causes the ring of light to be directed out of the portable Raman probe such that some of the light may scatter and fluoresce away from the collection lens when contacting the non-opaque barrier (and any collected barrier backscatter emissions will be directed away from entering into the spectrometer). In some implementations, the focusing element includes a diffractive focusing element that includes a grating axicon, a reflective focusing element that includes a conical mirror, or a refractive focusing element that includes an axicon prism or lens.

In one or more implementations, the portable Raman probe includes an optical element that converts the emitted light into the ring of light and/or a pass-through mirror that reflects the ring of light onto the focusing element and around the collection lens. In some implementations, the pass-through mirror is positioned in a light path after the collection lens and the pass-through mirror reflects the ring of light when at the first wavelength range while allowing the excited light at the second wavelength range to travel through the pass-through mirror along the light path from the collection lens to a spectrometer. In a few implementations, the optical element is an axicon that converts the emitted light into the ring of light, the pass-through mirror includes an interior hole that allows the excited light at the second wavelength range to travel through the pass-through mirror along the light path, and/or the interior hole has a diameter smaller than the diameter of the ring of light such that the ring of light reflects off of the pass-through mirror outside of the interior hole.

In various implementations, the optical element is a combination of axicon lenses that converts the emitted light into the ring of light and/or the pass-through mirror includes a dichroic mirror that reflects the emitted light at the first wavelength range off a surface of the pass-through mirror while allowing the excited light at the second wavelength range to pass through the surface of the pass-through mirror.

In one or more implementations, the portable Raman probe includes a detector that receives the excited light and/or a rejection filter between the collection lens and the detector that filters out emitted light at the first wavelength range received by the collection lens such that the emitted light at the first wavelength range does not reach the detector. In some implementations, the portable Raman probe also includes a grating that diffracts the excited light received at the collection lens, where the excited light is at the second wavelength range, and where the excited light travels to the detector and/or a communication interface that outputs processing results based on the excited lights collected at the detector to a client device. In various implementations, the portable Raman probe includes a combination of axicon lenses that converts the emitted light into the ring of light, where the ring of light is non-expanding, where at least a portion of the ring of light travels directly from the combination of axicon lenses to the focusing element without contacting additional optical elements.

In one or more implementations, the portable probe includes a light source that emits a light at a first wavelength range; an axicon that separates the light into a ring of light; and a focusing element that has and/or surrounds a collection lens. In some instances, the focusing element receives the ring of light and directs the ring of light out of the portable Raman probe. In various implementations, the focusing element encircles or surrounds the collection lens and the collection lens receives excited light at a second wavelength range.

In one or more implementations, the portable Raman probe includes a pass-through mirror, where the pass-through mirror includes a surface that reflects the ring of light along a first light path from the axicon to the focusing element that includes a grating axicon and is around the collection lens and/or the pass-through mirror includes an interior hole in the surface that allows the excited light at the second wavelength range to travel through the interior hole along a second light path from the collection lens to a spectrometer.

In one or more implementations, the light source is located at an angle from the focusing element. In some of these implementations, the focusing element directs the ring of light to refract out of the portable Raman probe at an angle such that at least some of the light reflected off of a non-opaque barrier adjacent to the portable Raman probe reflects away from the collection lens. In various implementations, the portable Raman probe includes a spectrometer that detects and processes the excited light, a rejection filter that filters out light at the first wavelength range received by the collection lens such that the light at the first wavelength range does not reach the spectrometer, and/or a grating that diffracts the excited light in the second wavelength range, which is received at the collection lens, to the spectrometer.

FIG. 13 illustrates an example series of acts for utilizing a portable Raman probe to collect spectra for a substance within a container having a non-opaque barrier in accordance with one or more implementations. As shown, the series of acts 1300 includes an act 1310 of emitting a light beam using a pair of axicon lenses including an exterior axicon lens having an interior hole and an interior axicon lens. For instance, the act 1310 may involve emitting a light beam utilizing a pair of axicon lenses including an exterior axicon lens having a first conical surface and an interior axicon lens having a second conical surface, where the exterior axicon lens includes an interior hole.

As further shown, the series of acts 1300 includes an act 1320 of generating a light ring utilizing the pair of axicon lenses. For example, the act 1320 may involve generating a non-expanding light ring utilizing the pair of axicon lenses. In addition, the act 1320 includes sub-acts. For instance, the act 1320 includes a sub-act 1322 of passing the light beam through the interior hole of the exterior axicon lens. For example, the sub-act 1322 of may involve passing the light beam through the interior hole of the exterior axicon lens. Additionally, the act 1320 includes a sub-act 1324 of reflecting the light beam off of the interior axicon lens toward the exterior axicon lens. For example, the sub-act 1324 of may involve reflecting the light beam off of the second conical surface of the interior axicon lens toward the exterior axicon lens to generate a reflected light beam. Further, the act 1320 includes a sub-act 1326 of reflecting the light beam off the exterior axicon lens. For example, the sub-act 1326 may involve further reflecting the reflected light beam off the first conical surface of the exterior axicon lens.

As further shown, the series of acts 1300 includes an act 1330 of passing the light ring through a grating axicon by diffracting the light from the light ring to a focal point. For example, the act 1330 may include passing the non-expanding light ring through a grating axicon and/or a diffractive optic encoded with axicon optical properties, where the grating axicon accepts the non-expanding light ring and diffracts light from the non-expanding light ring to a focal point beyond the optical diffraction device.

The series of acts 1300 can include additional acts in various implementations. For example, in some implementations, the series of acts 1300 includes generating excited light by reflecting diffracted light off a substance behind a non-opaque barrier surface adjacent to the optical diffraction device, and collecting the excited light that reflects off the substance at a collection lens located in an interior hole of the grating axicon.

In various implementations, the optical diffraction device includes a pair of axicon lenses that transform an input light beam traveling in a first direction into a non-expanding light ring as it travels away from the pair of axicon lenses in the first direction; and a grating axicon. In some instances, the grating axicon accepts the non-expanding light ring and diffracts light from the non-expanding light ring to a focal point beyond the grating axicon.

In some implementations, the grating axicon includes multiple grating zones that have different focal attributes. In various implementations, a first grating zone of the multiple grating zones has a first focal length and a second grating zone of the multiple grating zones has a second focal length that differs from the first focal length. In certain implementations, the multiple grating zones of the grating axicon cause the non-expanding light ring to diffract at different angles to create an illumination pattern that differs from a base illumination pattern caused by the grating axicon having a single grating zone.

In one or more implementations, the grating axicon includes an interior hole where the non-expanding light ring passes through a surface of the grating axicon encircling the interior hole. In one or more implementations, the optical diffraction device also includes a collection lens adhered to the surface of the grating axicon and/or located within the interior hole of the grating axicon. In some implementations, at least a portion of the non-expanding light ring travels directly from the axicon lenses to the grating axicon without contacting additional optical elements. In some implementations, the optical diffraction device is part of a portable Raman spectrometer device.

In one or more implementations, the grating axicon causes the non-expanding light ring to diffract out of the optical diffraction device onto a non-opaque barrier surface located closer to the optical diffraction device and a sample located beyond the non-opaque barrier surface, and/or the light reflected off the object surface reflects towards the collection lens. In some instances, the light reflected off of the non-opaque barrier surface reflects away from the collection lens. In some implementations, the optical diffraction device includes a spectrometer that analyzes collected excited light that reflects off of an object at a collection lens located in an interior hole (e.g., the inner surface) of the grating axicon. In some instances, the collection lens is mounted to one or both of the graxicon surfaces.

In one or more cases, the optical diffraction device includes a pass-through mirror that reflects the non-expanding light ring onto the grating axicon and around the collection lens. In some implementations, the pass-through mirror includes an interior hole that allows excited light passing along a second light path to pass in-between the non-expanding light ring and through the interior hole in the pass-through mirror, and/or the pass-through mirror is a dichroic mirror that reflects the non-expanding light ring at a first wavelength and allows the excited light at a second wavelength to travel through the pass-through mirror along the second light path.

In some implementations, the optical reflective device includes a pair of axicon lenses having an exterior axicon lens having a first conical surface, where the exterior axicon lens includes an interior hole; an interior axicon lens having a second conical surface, where the optical reflective device allows a light beam to travel through the interior hole of the exterior axicon lens, reflect off of the second conical surface of the interior axicon lens, reflect off the first conical surface of the exterior axicon lens, and travel away from the optical reflective device in a light ring as it travels away from the exterior axicon lens; and a grating axicon, where the grating axicon accepts the light ring and diffracts light from the light ring to a focal point beyond the grating axicon.

In one or more implementations, the light ring is a non-expanding light ring, moving a location of the interior axicon lens longitudinally along a center axis of the exterior axicon lens causes a diameter of the non-expanding light ring to change size when reflecting off of the exterior axicon lens, and/or a ring thickness of the non-expanding light ring remains a same size regardless of the diameter of the non-expanding light ring as it travels away from the exterior axicon lens. In some instances, moving the interior axicon lens toward the exterior axicon lens causes the diameter of the non-expanding light ring to shrink before it travels away from the exterior axicon lens In one or more implementations, the exterior axicon lens includes a flexible membrane that, when moved, changes an angle of the first conical surface, which changes a diameter of the light ring before it travels away from the exterior axicon lens. In some implementations, the interior axicon lens includes a flexible membrane that moves to change an angle of the second conical surface, which changes a diameter of the light ring before it travels away from the exterior axicon lens. In various implementations, the first conical surface of the exterior axicon lens generates a conical outer reflection and/or the second conical surface of the interior axicon lens generates a conical interior reflection.

FIG. 14 corresponds to identifying substances stored in non-opaque containers. To illustrate, FIG. 14 shows an example series of acts for utilizing a spectra refinement machine-learning model to generate a refined spectrum for a substance within a container having a non-opaque barrier in accordance with one or more implementations.

As shown, the series of acts 1400 includes an act 1410 of emitting light from a portable Raman probe toward a substance in a container. For instance, the act 1410 may include emitting light via a grating axicon of a portable Raman probe toward a focal point associated with a substance located beyond a non-opaque container barrier.

As further shown, the series of acts 1400 includes an act 1420 of receiving, by the portable Raman probe, excited light scattered off of the substance. For example, the act 1420 may involve receiving, by a collection lens of the portable Raman probe, excited light that scattered or fluoresced off of the substance beyond the non-opaque container barrier.

As further shown, the series of acts 1400 includes an act 1430 of generating a refined spectrum from the excited light utilizing a spectra refinement machine-learning model. For example, the act 1430 may include generating a refined spectrum from a noisy spectrum associated with the excited light collected by a spectrometer by utilizing a spectra refinement machine-learning model that is trained to reduce noise and fluorescence from noisy spectra.

The series of acts 1400 can include additional acts in various implementations. For example, in some implementations, the series of acts 1400 includes determining a spectral analysis of the substance based on the refined spectrum. In one or more implementations, the series of acts 1400 includes matching the spectral analysis of the substance to a known substance to identify the substance stored in a non-opaque container having the non-opaque container barrier. In one or more implementations, the series of acts 1400 includes generating the spectra refinement machine-learning model utilizing different augmented data for each training cycle.

In some implementations, the spectra refinement machine-learning model determines a filter edge at a beginning of the noisy spectrum, filters out the noisy spectrum before the filter edge, and/or removes unwanted overall noise and/or broadband background fluorescence, signal, or spectra (e.g., the background itself) from the noisy spectrum. In various implementations, the spectra refinement machine-learning model includes a U-Net neural network architecture and/or processes the noisy spectrum as a 1-dimensional data set. In one or more implementations, the spectra refinement machine-learning model converts the noisy spectrum having no distinct spectral peaks into the refined spectrum having multiple distinct spectral peaks.

In one or more implementations, the noisy spectrum does not include any distinct spectral peaks and/or the refined spectrum includes multiple distinct spectral peaks. In various implementations, the grating axicon surrounds the collection lens and/or the grating axicon includes grating axicon lens that is encoded to redirect the light from a first direction within the portable Raman probe to a second direction outside of the portable Raman probe that intersects with itself at the focal point.

In one or more implementations, the series of acts 1400 includes providing the refined spectrum to a library matching tool or algorithm (and accompanying spectral library for identification of one or more chemical component) to identify one or more chemical components that make up the substance.

In some implementations, the spectra refinement machine-learning model is part of a portable Raman probe. For example, the portable Raman probe includes a grating axicon surrounding a collection lens that accepts a path of light and directs the path of light out of the portable Raman probe toward a focal point, the collection lens that receives excited light that scatters or fluoresces off of a substance beyond a non-opaque container barrier, and/or the spectra refinement machine-learning model that generates a refined spectrum from a noisy spectrum associated with the excited light collected by a spectrometer by reducing noise and fluorescence from noisy spectra.

In various implementations, the grating axicon surrounds the collection lens and/or the grating axicon includes an axicon lens that is encoded to redirect the path of light from a first direction within the portable Raman probe to a second direction outside of the portable Raman probe that intersects with itself at the focal point.

In one or more implementations, the portable Raman probe includes an optical element that generates the path of light as a ring of light with a fixed non-expanding width. In some implementations, the focal point is associated with the substance that is beyond the non-opaque container barrier.

In some implementations, the portable Raman spectrometer probe includes a light source that generates a ring of light, a grating axicon surrounding a collection lens that accepts the ring of light and directs the ring of light out of the portable Raman spectrometer probe toward a focal point associated with a substance located beyond a non-opaque container barrier, the collection lens that receives excited light that scatters or fluoresces off of the substance beyond the non-opaque container barrier, the spectra refinement machine-learning model that generates a refined spectrum from a noisy spectrum associated with the excited light collected by a spectrometer by reducing noise and fluorescence from noisy spectra, and a spectrometer that processes the refined spectrum to generate a spectral analysis of the substance.

A "computer network" (hereinafter "network") is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network (i.e., computer network) described in this document may represent a network or collection of networks (such as the Internet, a corporate intranet, a virtual private network (VPN), a local area network (LAN), a wireless local area network (WLAN), a cellular network, a wide area network (WAN), a metropolitan area network (MAN), a Bluetooth network (e.g., a paired connection), or a combination of two or more such networks) over which one or more computing devices may access the portable Raman probe 200a. Indeed, the networks described in this document may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network (i.e., computer network) or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by at least one processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 15:
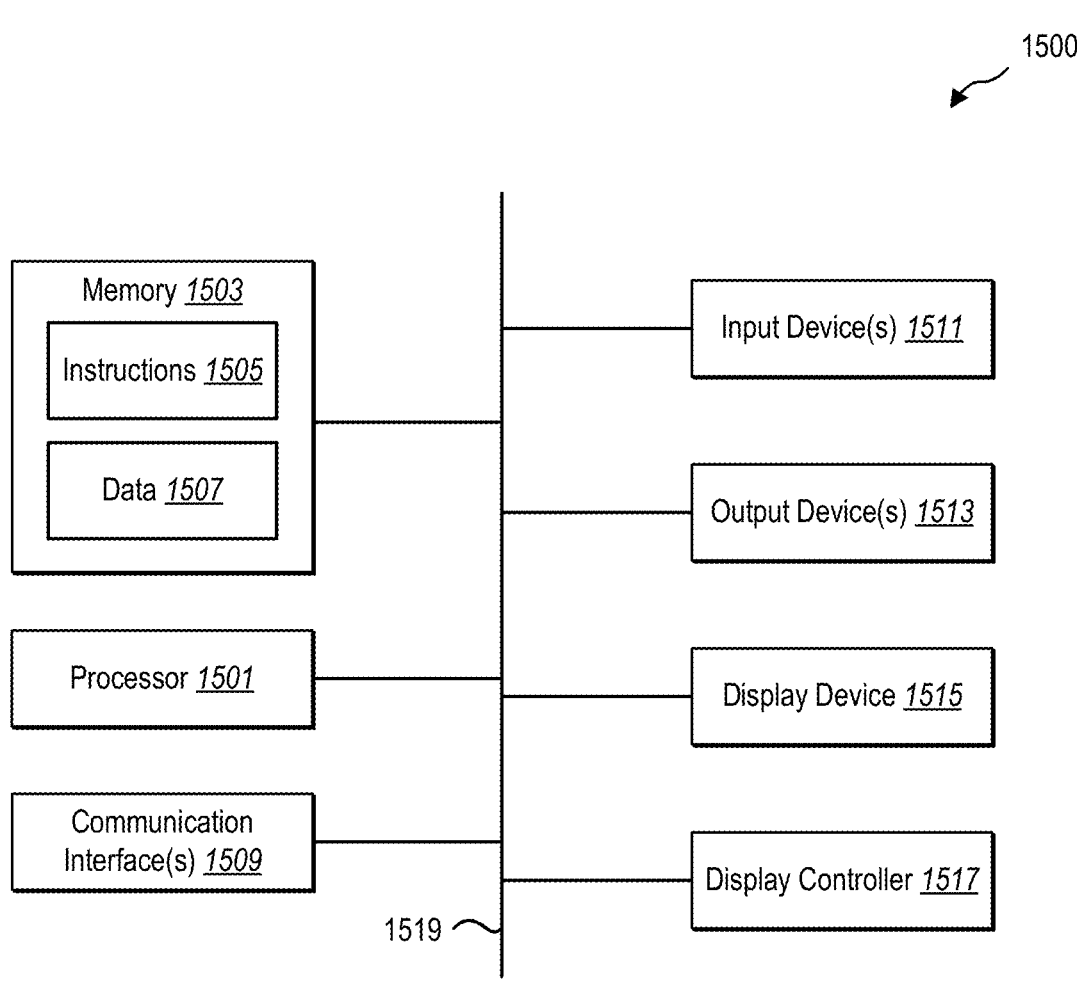
FIG. 15 illustrates certain components that may be included within a computer system.

FIG. 15 illustrates certain components that may be included within a computer system 1500. The computer system 1500 may be used to implement the various computing devices, components, and systems described in this document.

In various implementations, the computer system 1500 may represent one or more of the client devices, server devices, or other computing devices described above. For example, the computer system 1500 may refer to various types of network devices capable of accessing data on a network (i.e., a computer network), a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1500 includes a processor 1501 (i.e., at least one processor). The processor 1501 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 1501 may be referred to as a central processing unit (CPU). Although the processor 1501 shown is just a single processor in the computer system 1500 of FIG. 15, in an alternative con-
figuration, a combination of processors (e.g., an ARM and
DSP) could be used.

The computer system 1500 also includes memory 1503 in
electronic communication with the processor 1501. The
memory 1503 may be any electronic component capable of
storing electronic information. For example, the memory
1503 may be embodied as random-access memory (RAM),
read-only memory (ROM), magnetic disk storage media,
optical storage media, flash memory devices in RAM,
on-board memory included with the processor, erasable
programmable read-only memory (EPROM), electrically
erasable programmable read-only memory (EEPROM), reg-
isters, and so forth, including combinations thereof.

The instructions 1505 and the data 1507 may be stored in
the memory 1503. The instructions 1505 may be executable
by the processor 1501 to implement some or all of the
functionality disclosed herein. Executing the instructions
1505 may involve the use of the data 1507 that is stored in
the memory 1503. Any of the various examples of modules
and components described in this document may be imple-
mented, partially or wholly, as instructions 1505 stored in
memory 1503 and executed by the processor 1501. Any of
the various examples of data described in this document may
be among the data 1507 that is stored in memory 1503 and
used during the execution of the instructions 1505 by the
processor 1501.

A computer system 1500 may also include one or more
communication interface(s) 1509 for communicating with
other electronic devices. The one or more communication
interface(s) 1509 may be based on wired communication
technology, wireless communication technology, or both.
Some examples of the one or more communication interface
(s) 1509 include a Universal Serial Bus (USB), an Ethernet
adapter, a wireless adapter that operates in accordance with
an Institute of Electrical and Electronics Engineers (IEEE)
1502.11 wireless communication protocol, a Bluetooth®
wireless communication adapter, and an infrared (IR) com-
munication port.

A computer system 1500 may also include one or more
input device(s) 1511 and one or more output device(s) 1513.
Some examples of the one or more input device(s) 1511
include a keyboard, mouse, microphone, remote control
device, button, joystick, trackball, touchpad, and light pen.
Some examples of the one or more output device(s) 1513
include a speaker and a printer. A specific type of output
device that is typically included in a computer system 1500
is a display device 1515. The display device 1515 used with
implementations disclosed herein may utilize any suitable
image projection technology, such as liquid crystal display
(LCD), light-emitting diode (LED), gas plasma, electrolu-
minescence, or the like. A display controller 1517 may also
be provided, for converting data 1507 stored in the memory
1503 into text, graphics, and/or moving images (as appro-
priate) shown on the display device 1515.

The various components of the computer system 1500
may be coupled together by one or more buses, which may
include a power bus, a control signal bus, a status signal bus,
a data bus, etc. For the sake of clarity, the various buses are
illustrated in FIG. 15 as a bus system 1519.

Those skilled in the art will appreciate that the disclosure
may be practiced in network computing environments with
many types of computer system configurations, including,
personal computers, desktop computers, laptop computers,
message processors, hand-held devices, multi-processor sys-
tems, microprocessor-based or programmable consumer
electronics, network PCs, minicomputers, mainframe computers, mobile telephones, PDAs, tablets, pagers, routers,
switches, and the like. The disclosure may also be practiced
in distributed system environments where local and remote
computer systems, which are linked (either by hardwired
data links, wireless data links, or by a combination of
hardwired and wireless data links) through a network (i.e.,
computer network), both perform tasks. In a distributed
system environment, program modules may be located in
both local and remote memory storage devices.

The techniques described in this document may be imple-
mented in hardware, software, firmware, or any combination
thereof unless specifically described as being implemented
in a specific manner. Any features described as modules,
components, or the like may also be implemented together
in an integrated logic device or separately as discrete but
interoperable logic devices. If implemented in software, the
techniques may be realized at least in part by a non-
transitory processor-readable storage medium, including
instructions that, when executed by at least one processor,
perform one or more of the methods described in this
document. The instructions may be organized into routines,
programs, objects, components, data structures, etc., which
may perform particular tasks and/or implement particular
data types, and which may be combined or distributed as
desired in various implementations.

Computer-readable media can be any available media that
can be accessed by a general-purpose or special-purpose
computer system. Computer-readable media that store com-
puter-executable instructions are non-transitory computer-
readable storage media (devices). Computer-readable media
that carry computer-executable instructions are transmission
media. Thus, by way of example, and not limitation, imple-
mentations of the disclosure can include at least two dis-
tinctly different kinds of computer-readable media: non-
transitory computer-readable storage media (devices) and
transmission media.

As used herein, non-transitory computer-readable storage
media (devices) may include RAM, ROM, EEPROM, CD-
ROM, solid-state drives ("SSDs") (e.g., based on RAM),
Flash memory, phase-change memory ("PCM"), other types
of memory, other optical disk storage, magnetic disk storage
or other magnetic storage devices, or any other medium
which can be used to store desired program code means in
the form of computer-executable instructions or data struc-
tures and which can be accessed by a general-purpose or
special-purpose computer.

The steps and/or actions of the methods described in this
document may be interchanged with one another without
departing from the scope of the claims. In other words,
unless a specific order of steps or actions is required for the
proper operation of the method that is being described, the
order and/or use of specific steps and/or actions may be
modified without departing from the scope of the claims.

The term "determining" encompasses a wide variety of
actions and, therefore, "determining" can include calculat-
ing, computing, processing, deriving, investigating, looking
up (e.g., looking up in a table, a database, or another data
structure), ascertaining, and the like. Also, "determining"
can include receiving (e.g., receiving information), access-
ing (e.g., accessing data in a memory), and the like. Also,
"determining" can include resolving, selecting, choosing,
establishing, and the like.

The terms "including," "involving," and "having" are
intended to be inclusive and mean that there may be addi-
tional elements other than the listed elements. Additionally,
it should be understood that references to "one implemen-
tation" or "implementations" of the present disclosure are not intended to be interpreted as excluding the existence of additional implementations that also incorporate the recited features. For example, any element or feature described concerning an implementation herein may be combinable with any element or feature of any other implementation described in this document, where compatible.

The present disclosure may be embodied in other specific forms without departing from its spirit or characteristics. The described implementations are to be considered illustrative and not restrictive. The scope of the disclosure is therefore indicated by the appended claims rather than by the foregoing description. Changes that come within the meaning and range of equivalency of the claims are to be embraced within their scope.

What is claimed is:

1. A portable Raman probe comprising:
a light source that generates an emitted light at a first wavelength range;
a ring of light within the portable Raman probe based on the emitted light;
a focusing element surrounding a collection lens, wherein the focusing element accepts the ring of light and directs the ring of light out of the portable Raman probe toward a focal point associated with a substance that is beyond a non-opaque barrier; and
the collection lens that receives excited light at a second wavelength range refracted off the substance beyond the non-opaque barrier.

2. The portable Raman probe of claim 1, wherein the focusing element causes the ring of light to be directed out of the portable Raman probe such that light scatters and fluoresces away from the collection lens when contacting the non-opaque barrier.

3. The portable Raman probe of claim 1, wherein the focusing element comprises:
a diffractive focusing element that includes a grating axicon;
a reflective focusing element that includes a conical mirror; or
a refractive focusing element that includes an axicon prism or lens.

4. The portable Raman probe of claim 1, further comprising:
an optical element that converts the emitted light into the ring of light; and
a pass-through mirror that reflects the ring of light onto the focusing element and around the collection lens.

5. The portable Raman probe of claim 4, wherein:
the pass-through mirror is positioned in a light path after the collection lens; and
the pass-through mirror reflects the ring of light when at the first wavelength range while allowing the excited light at the second wavelength range to travel through the pass-through mirror along the light path from the collection lens to a spectrometer.

6. The portable Raman probe of claim 5, wherein:
the optical element is an axicon that converts the emitted light into the ring of light;
the pass-through mirror comprises an interior hole that allows the excited light at the second wavelength range to travel through the pass-through mirror along the light path; and
the interior hole has a diameter smaller than the diameter of the ring of light such that the ring of light reflects off of the pass-through mirror outside of the interior hole.

7. The portable Raman probe of claim 4, wherein:
the optical element is a combination of axicon lenses that converts the emitted light into the ring of light; and
the pass-through mirror comprises a dichroic mirror that reflects the emitted light at the first wavelength range off a surface of the pass-through mirror while allowing the excited light at the second wavelength range to pass through the surface of the pass-through mirror.

8. The portable Raman probe of claim 1, further comprising:
a detector that receives the excited light; and
a rejection filter between the collection lens and the detector that filters out emitted light at the first wavelength range received by the collection lens such that the emitted light at the first wavelength range does not reach the detector.

9. The portable Raman probe of claim 8, further comprising:
a grating that diffracts the excited light received at the collection lens, wherein the excited light is at the second wavelength range, and wherein the excited light travels to the detector; and
a communication interface that outputs processing results based on the excited light collected at the detector to a client device.

10. The portable Raman probe of claim 1, further comprising a combination of axicon lenses that converts the emitted light into the ring of light, wherein the ring of light is non-expanding, wherein at least a portion of the ring of light travels directly from the combination of axicon lenses to the focusing element without contacting additional optical elements.

11. A portable Raman probe comprising:
a light source that emits a light at a first wavelength range;
an axicon that separates the light into a ring of light; and
a focusing element surrounding a collection lens, wherein:
the focusing element receives the ring of light and directs the ring of light out of the portable Raman probe;
the focusing element encircles the collection lens; and
the collection lens receives excited light at a second wavelength range.

12. The portable Raman probe of claim 11, further comprising a pass-through mirror, wherein:
the pass-through mirror comprises a surface that reflects the ring of light along a first light path from the axicon to the focusing element that comprises a grating axicon and is around the collection lens; and
the pass-through mirror comprises an interior hole in the surface that allows the excited light at the second wavelength range to travel through the interior hole along a second light path from the collection lens to a spectrometer.

13. The portable Raman probe of claim 11, wherein the light source is located at an angle from the focusing element.

14. The portable Raman probe of claim 11, wherein the focusing element directs the ring of light to refract out of the portable Raman probe at an angle such that light reflected off of a non-opaque barrier adjacent to the portable Raman probe reflects away from the collection lens.

15. The portable Raman probe of claim 11, further comprising:
a spectrometer that detects and processes the excited light;
a rejection filter that filters out light at the first wavelength range received by the collection lens such that the light at the first wavelength range does not reach the spectrometer; and a grating that diffracts the excited light in the second wavelength range, which is received at the collection lens, to the spectrometer.

16. A method for utilizing a spectrometer to detect substances stored in non-opaque containers, comprising:

emitting a first wavelength range of light via a grating axicon of a portable spectrometer probe through a non-opaque barrier and onto a substance beyond the non-opaque barrier;

receiving a second wavelength range of light at a collection lens of the portable spectrometer probe, wherein the collection lens is encircled by the grating axicon;

passing the second wavelength range of light through a grating within the portable spectrometer probe that diffracts the second wavelength range of light onto a detector; and providing processing results based on the second wavelength range of light collected at the detector to reveal a composition of the substance beyond the non-opaque barrier.

17. The method of claim 16, further comprising splitting a light comprising the first wavelength range of light into a ring of light between a light source and the grating axicon within the portable spectrometer probe.

18. The method of claim 17, further comprising:

reflecting the ring of light off of a surface of a pass-through mirror onto the grating axicon and around the collection lens; and allowing a portion of the second wavelength range of light to pass through the pass-through mirror along a light path between the collection lens and the grating.

19. The method of claim 17, wherein splitting a light comprises utilizing an axicon to convert the light into the ring of light, wherein a diameter of the ring of light expands as it travels away from the axicon while maintaining a same ring width.

20. The method of claim 17, wherein splitting a light comprises utilizing a combination of axicon lenses that converts the light into the ring of light, wherein the ring of light is non-expanding as it travels away from the axicon lenses.

* * * * *